United States Patent [19]
Ronkin et al.
[11] 3,732,546
[45] May 8, 1973

[54] INFORMATION STORAGE AND RETRIEVAL SYSTEM

[76] Inventors: David G. Ronkin, 15-70 208th Street, Bayside, N.Y. 11360; David J. Schwartz, 8 Colgate Road, Greenlawn, N.Y. 11740

[22] Filed: Feb. 4, 1971

[21] Appl. No.: 112,542

[52] U.S. Cl. ....................340/172.5, 353/26, 214/11
[51] Int. Cl. ....................G06f 13/08
[58] Field of Search ....................340/172.5; 353/25, 353/26; 214/11

[56] References Cited

UNITED STATES PATENTS

| | | | |
|---|---|---|---|
| 3,366,928 | 1/1968 | Rice et al. | 340/172.5 |
| 3,296,727 | 1/1967 | Liguori | 353/25 |
| 3,467,949 | 9/1969 | Moore | 340/172.5 |
| 3,476,472 | 11/1969 | Schneeberger | 353/26 |
| 3,229,877 | 1/1966 | McLean | 340/172.5 |
| 3,164,059 | 1/1965 | Turrentine | 353/26 |

*Primary Examiner*—Paul J. Henon
*Assistant Examiner*—John P. Vandenburg
*Attorney*—Morgan, Finnegan, Durham & Pine

[57] ABSTRACT

Disclosed is a high capacity, random access, alterable magnetic memory system employing sets of rotatable annular arrays of multi-track tape cassettes serving as the storage media. Under control of a data controller, containing a small programmable computer and direct access storage disc or drum, the cassette arrays are each rotated to bring addressed cassettes into engaging relationship with respective tape transports which receive the requisitioned cassette, position a read/write, write/read head assembly in registration with the addressed track, and drive the tape. An interface system in the controller couples the memory system to one or more host computers of the user for reading data from or writing data on the tape, without the need to stop the tape at the addressed data block site.

33 Claims, 18 Drawing Figures

INVENTORS
DAVID G. RONKIN
BY DAVID J. SCHWARTZ
Morgan, Finnegan, Durham & Pine
ATTORNEYS INVENTORS
DAVID G. RONKIN
DAVID J. SCHWARTZ
BY
Morgan, Finnegan, Durham & Pine
ATTORNEYS INVENTORS
DAVID G. RONKIN
DAVID J. SCHWARTZ
BY
Morgan, Finnegan, Durham & Pine
ATTORNEYS INVENTORS
DAVID G. RONKIN
DAVID J. SCHWARTZ
BY
Morgan, Finnegan, Durham & Pine
ATTORNEYS

PATENTED MAY 8 1973 3,732,546

SHEET 05 OF 12

INVENTORS
DAVID G. RONKIN
BY DAVID J. SCHWARTZ

Morgan, Finnegan, Durham & Pine
ATTORNEYS

INVENTORS
DAVID G. RONKIN
BY DAVID J. SCHWARTZ
Morgan, Finnegan, Durham & Pine
ATTORNEYS INVENTORS
DAVID G. RONKIN
DAVID J. SCHWARTZ
BY Morgan, Finnegan, Durham & Pine
ATTORNEYS INVENTORS
DAVID G. RONKIN
DAVID J. SCHWARTZ
BY
Morgan, Finnegan, Durham & Pine
ATTORNEYS

INVENTORS
DAVID G. RONKIN
BY DAVID J. SCHWARTZ

Morgan, Finnegan, Durham & Pine
ATTORNEYS

INVENTORS
DAVID G. RONKIN
DAVID J. SCHWARTZ
BY
Morgan, Finnegan, Durham & Pine
ATTORNEYS INVENTORS
DAVID G. RONKIN
DAVID J. SCHWARTZ
BY
Morgan, Finnegan, Durham & Pine
ATTORNEYS INVENTORS
DAVID G. RONKIN
DAVID J. SCHWARTZ
BY
Morgan, Finnegan, Durham & Pine
ATTORNEYS

INFORMATION STORAGE AND RETRIEVAL SYSTEM

BACKGROUND AND BRIEF SUMMARY OF THE INVENTION

This invention relates to improvements in high capacity, random access, alterable, magnetic memory systems.

Very large, alterable memory requirements (e.g., $10^{10}$–$10^{12}$ bits) have normally been satisfied with tape systems. However, to accommodate such large files, all but a few tape reels have to be stored off-line and only brought on line when requested. As a consequence, rapid access is inhibited.

The invention described herein provides very large on-line storage capacity (e.g., $10^{12}$ bits) while concurrently providing improvements in access time. The memory system according to the invention provides multiple simultaneous access to stored data along with provisions for random or sequential access, read/write alterable storage capability and read after write for verification.

As the storage medium, the system utilizes annular rotatable arrays of magnetic tape cassettes, i.e., containers with magnetic tape loaded therein. This cassette storage system is controlled by a data controller embodying a small programmable computer as the processor, a direct access storage device cooperating therewith and an interface system for interfacing the processor with one or more host or user computers of the same or different types.

In the tape cassettes, high access speed is facilitated by means of high tape packing densities, multiple tape tracks, high speed searching of the tape and by providing an automatic cassette delivery system which simultaneously selects a multiplicity of addressed cassettes and loads these into their respective tape transport units for search, read and write operations. To further reduce access time the tape in each cassette is automatically reset to its midpoint.

After a cassette is engaged by the respective transport a multi-head transducer in the transport is positioned to the addressed track and a particular data block on that track is identified. The system may either read that block of data from the tape to the central data controller or write new data from the central controller onto the tape, these operations being performed on the fly without the requirement for starting or stopping the tape at the site of the selected block of data.

The system has provisions for temporarily storing the designated block of data in the central controller and selecting from that stored data block, a variable length record which may be transmitted to the host computer; alternatively a variable length record received from the host computer may be combined with other variable length records stored in the controller to form a fixed length block of data which is written on a selected track of a selected cassette.

In addition the system disclosed herein is capable of interfacing with the host computer as a random access data unit or as a sequential access data unit without any modifications to the host system.

Other objects and advantages of the invention will be apparent in the following description and in the practice of the invention.

Serving to illustrate an exemplary embodiment of the invention are the following detailed specification and drawings of which:

OVERALL SYSTEM DESCRIPTION

Figure 1:
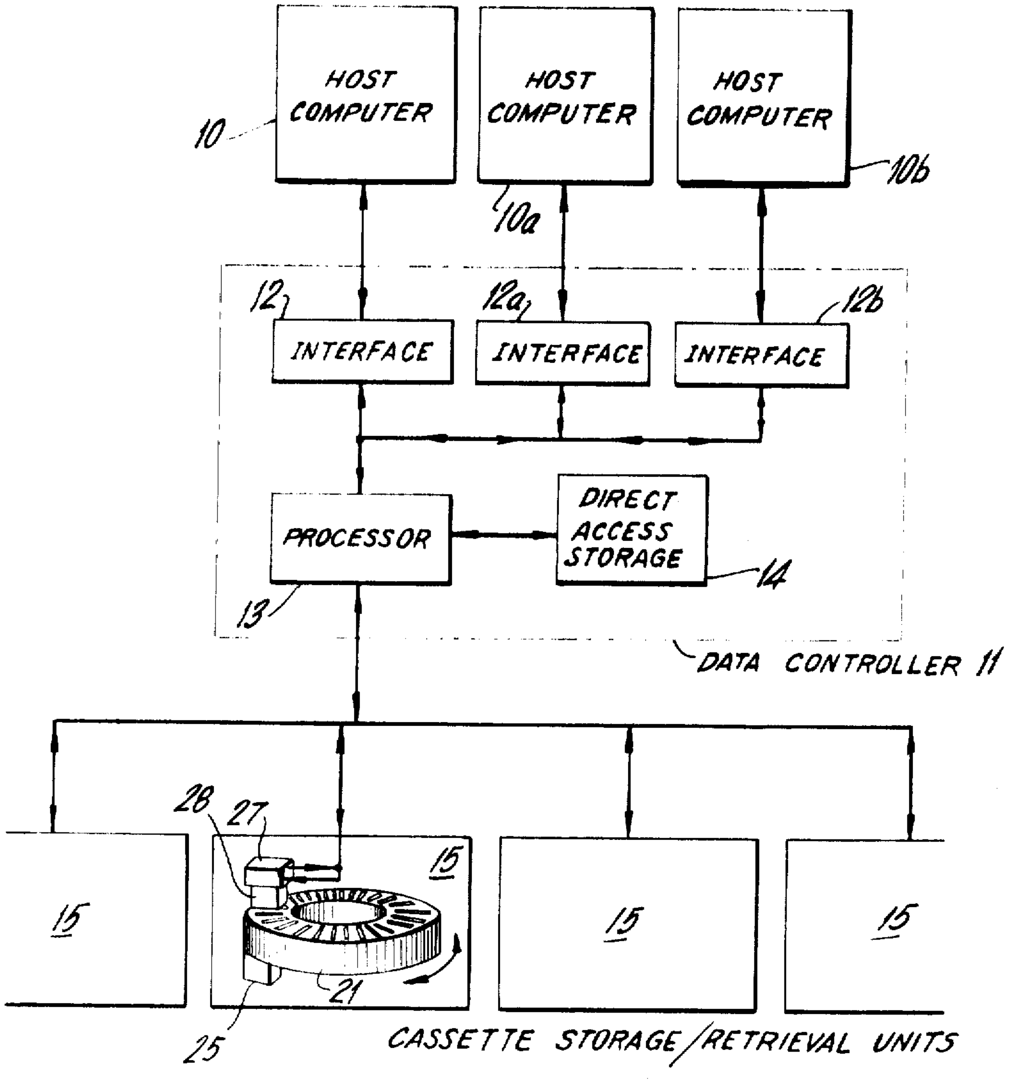
FIG. 1 is a general block diagram of the system showing its use with a plurality of host computers.

FIG. 1 illustrates the broad configuration of the mass memory system. The system is designed to be utilized by one or more host computers 10, 10a, 10b, . . . which connect with the data controller 11 consisting of interface sections 12, 12a, 12b . . . , a general purpose computer or processor 13, and a direct access storage unit 14 which is typically of the disk or drum type. A number of storage/retrieval units 15, which constitute the basic building blocks of the memory system, are connected to the data controller 11 which in turn buffers and interfaces the selected input/output data flowing to and from the host computers.

Figure 1A:
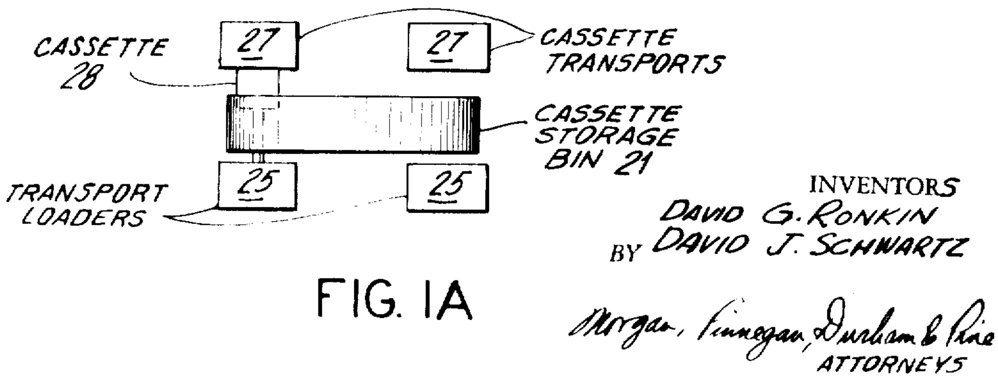
FIG. 1A is a schematic illustration of a cassette bin provided with two cassette transport/loader assemblies.

As seen in FIGS. 1 and 1A, each storage/retrieval unit 15 comprises arrays of tape cassettes 28 disposed in annular configuration in rotatable storage bins 21, there being eight such bins or arrays in each unit 15 in the illustrated system. The bins are rotated to position a cassette in registration with a transport loader 25 and transport 27 whereupon the addressed cassette is displaced by the loader into the transport. Multiple read/write heads in the transport are moved into registration with the selected track and the tape then driven.

A digital command from a host computer 10 requesting data is channeled to the programmable processor 13, which accepts the request for data and commands the appropriate storage/retrieval unit 15 to read a fixed block of data containing the host's requested record. A data block may consist of a sequential group of data records. Upon receipt of the data block the processor buffers the entire block and notifies the host computer that the block has been read. If the host desires to read a record from this data block the processor strips off the desired record and transmits this to the host computer.

If the host computer desires to write a new record the processor uses this information to update the data block. It first extracts the block containing the desired record from the appropriate storage/retrieval unit and buffers the data block on the direct access storage unit 14; then it modifies this block in accordance with the new data record received from the host computer; following this, the processor commands the appropriate storage/retrieval unit to search for the location of the data block. Prior to the data block arriving at the read/write head, the buffered data is returned to core from direct access storage and the data block is transmitted to the read/write head in synchronism with the tape moving past the head to thereby record the modified data block. The data controller is configured to simultaneously request and read/write data from multiple read/write heads.

Figure 2:
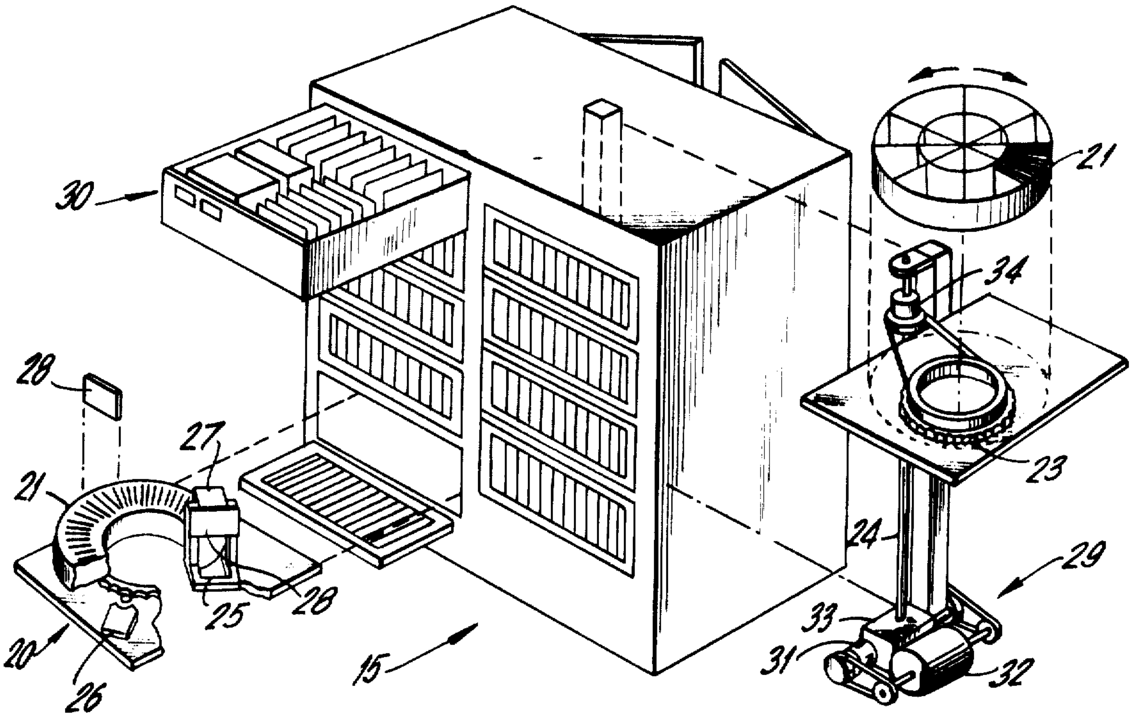
FIG. 2 is a perspective and schematic drawing of one of the storage/retrieval units containing a set of eight cassette storage units.

The eight modular multiple cassette handling assemblies 20 of each storage/retrieval unit 15 are illustrated further in FIG. 2. Each of these multiple cassette handling assemblies contains a removable bin or cassette holder 21, a turntable assembly 23 a clutch 34, the cassette loading mechanism 25, a detent mechanism 26, and the cassette transport 27 for performing read/write operations with the individual cassettes. In addition to the above, each storage/retrieval unit contains a bi-directional, magnetic clutch controlled, drive assembly 29 coupled through a gear box 33 to drive shaft 24, and it also contains transport electronics and interface electronics 30. Each storage/retrieval unit 15 has a capacity of over $128 \times 10^9$ bits.

Upon receipt of a digital command from the data controller 11, (FIG. 1) the appropriate cassette bin 21 is clutched to the shaft 24 by the respective gear clutch mechanism 34 and one of two magnetic particle clutches 31 is energized thereby connecting the constantly turning motor 32 through gear box 33 to drive shaft 24. Utilizing synchro inputs, tachometer and network feedback and a phase sensitive servo amplifier, the addressed cassette is rotated in the shortest direction, to the transport station. To accurately position and hold the turntable, a solenoid actuated detent mechanism 26 is utilized when the cassette bin is sufficiently close to its final position.

Each cassette bin consists of 44 cassettes and has a capacity of $15.66 \times 10^9$ bits. The cassette bin may be removed in four pie shaped segments or quadrants of 11 tapes each. This technique keeps the individual cassettes in place and in their proper sequence. It also provides for unlimited off-line storage of data, should such additional storage be desired.

Figure 3:
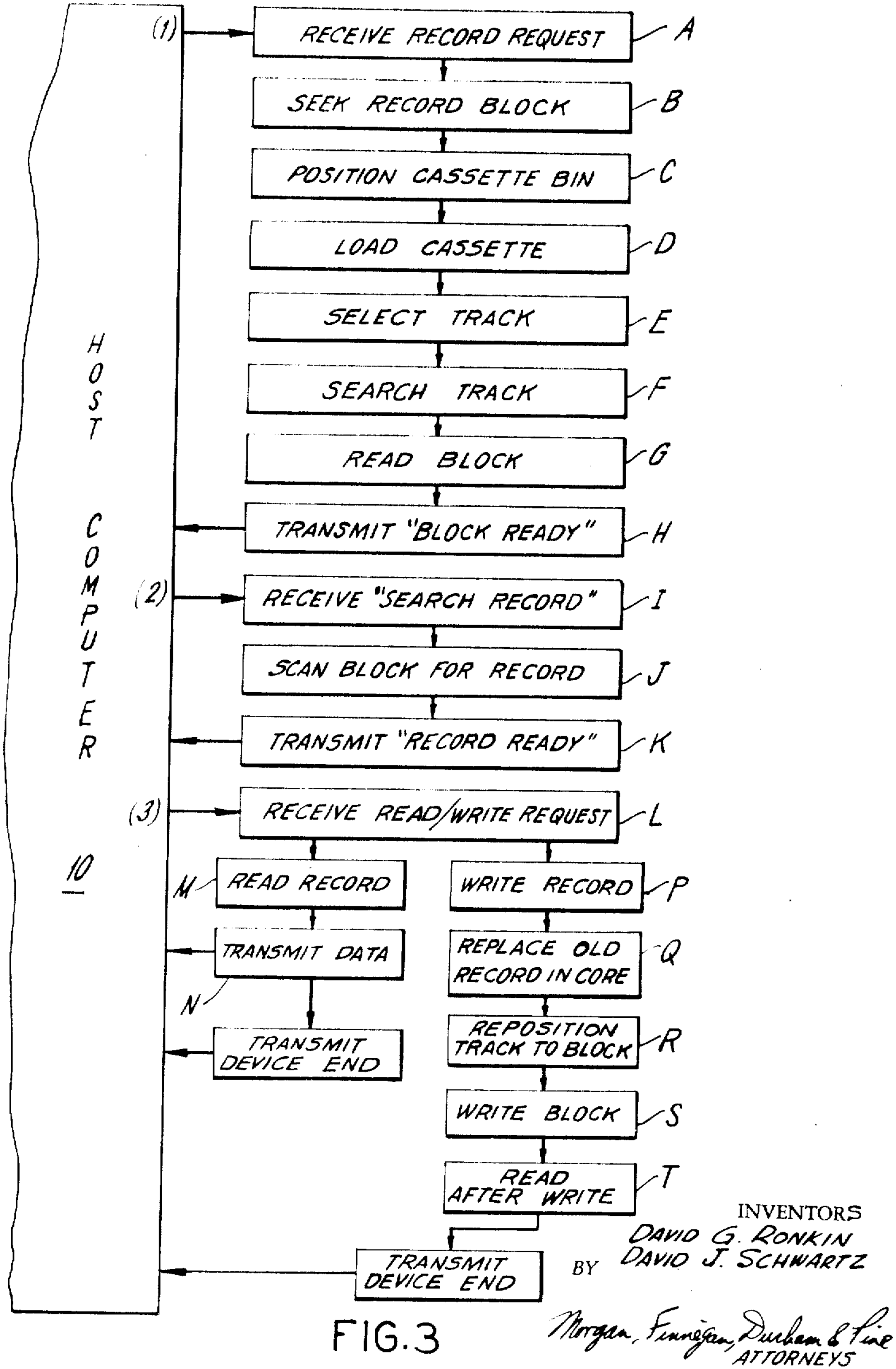
FIG. 3 is a block diagram illustrating certain sequences of operations performed by the system.

FIG. 3 illustrates the sequence in which the storage/retrieval system performs various operations. After receiving a record request from a host computer, (Step A) the request is transmitted to the processor section of the data controller via the host computer interface 12 (FIG. 1). The processor 13 operates on this request to locate the required data block in the storage/retrieval units 15 (Step B) by positioning the cassette bin (Step C) so as to place the addressed cassette at the tape transport. The cassette is loaded from the bin (Step D) into the tape transport and the transport head assembly is positioned to the track (Step E) containing the desired data block. The tape is then searched (Step F) by being driven past the head assembly and the desired data block is read from the tape on the fly and transmitted to the data controller (Step G).

A "Block Ready" status signal is sent to the host computer by the controller (Step H), which responds with a "Search Record" request (Step I) which causes the data controller to scan the data block for the desired record (Step J). Upon locating the desired record, a "Record Ready" status signal is sent to the host computer (Step K), whose response is then either a "Read Record" or a "Write Record" command (Step L). In the event the former is received, the record is read (Step M) and then transmitted to the host computer (Step N). A "Device End" command is then transmitted to the host computer signifying the end of the operation.

If a "Write Record" command is received, (Step P), the old record is replaced in core by the new record (Step Q), the tape is repositioned to the data block (Step R), the data block is written onto the tape on the fly (Step S), a read-after-write operation is then performed for verification (Step T) and a "Device End" command is transmitted to the host computer signifying the end of the operation.

Figure 4:
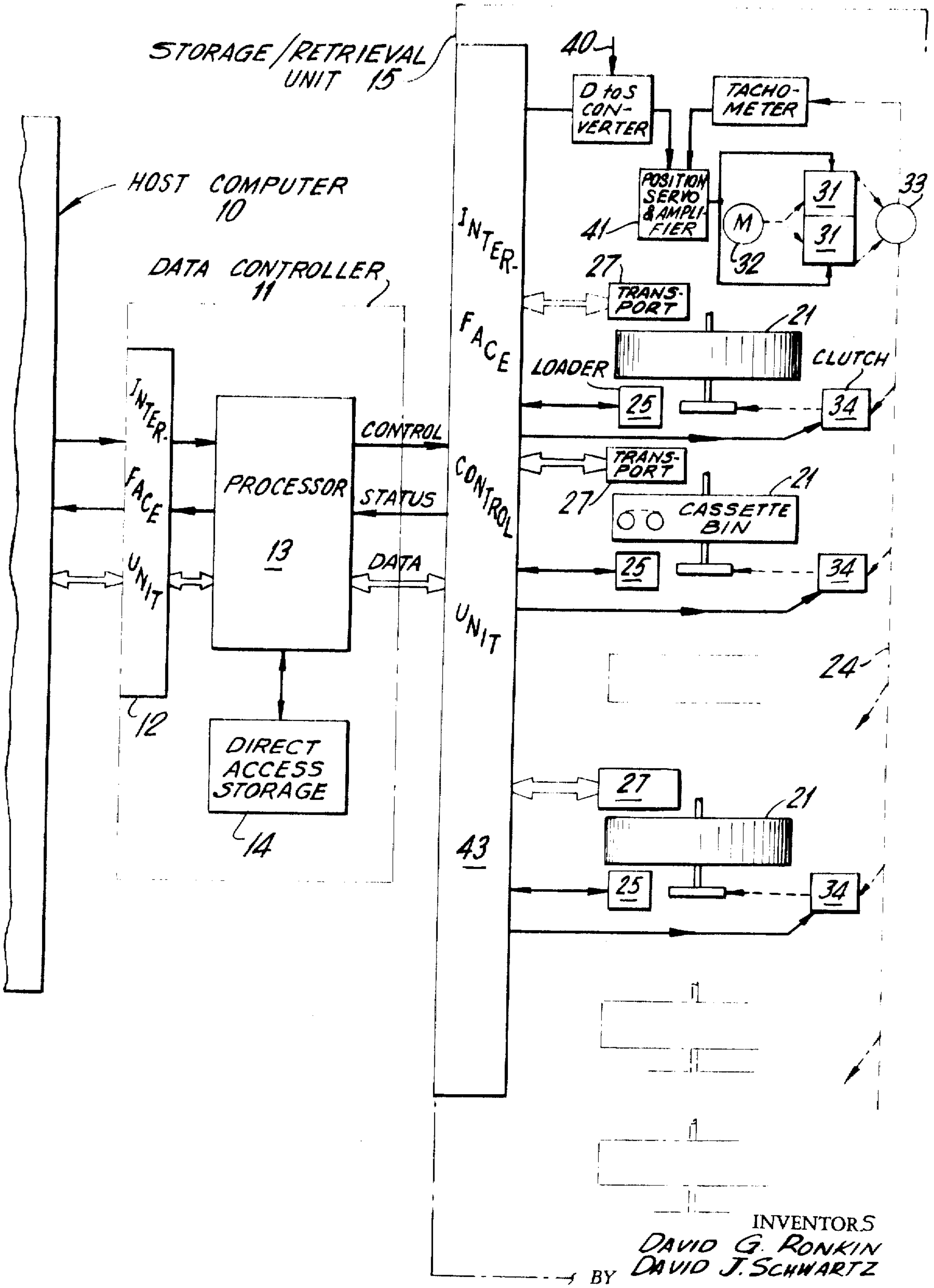
FIG. 4 is a block diagram illustrating certain phases of system signal flow and system configuration including additional elements of one of the storage/retrieval units.

FIG. 4 illustrates the transfer of control commands, status signals and data between the host computer 10, the data controller 11 and the storage/retrieval unit 15.

When the host computer desires to read or up-date information stored in a storage/retrieval unit it sends Record Locate and Record Identity control commands to the data controller interface unit 12. The data controller's processor 13 then determines the location in the storage/retrieval unit of the data block containing the desired record and supplies the address of the appropriate cassette bin 21 containing the desired tape cassette to the storage/retrieval unit interface control unit 43. The latter causes the engagement of the appropriate turntable clutch 34 and applies a digital bin position address generated by the processor to a digital-to-synchro converter 40 which transforms this digital address into an analog synchro command. The latter command is applied to the stator windings of a synchro transmitter whose rotor is positioned by the bin rotation. Thus any difference between the commanded position and the actual bin position generates an error signal which is applied to the bin position servo 41. A servo demodulator determines the desired position and direction of rotation required to access the cassette and applies a drive signal to the servo amplifier. The output of this amplifier is a DC signal which is applied to one of two counter rotating magnetic particle clutches 31 which have their input shafts constantly driven by opposite shaft ends of motor 32. The magnetic particle clutch energized is the one which will drive the bin positioning shaft 24 in the direction which will more quickly position (via the shorter rotational arc) the bin to align the desired tape cassette with the transport 27 and loader 25. The processor, via the interface control unit, commands the loader to load the desired cassette into the transport and commands the transport to position the magnetic tape sensing head assembly to the appropriate tape track and to drive the tape in the proper direction to access the desired data block. The processor then orders a sensing head to read the block of interest into the data controller. The data block is then stored in the direct access storage unit 14 and the record of interest is subsequently either read to the host computer or updated by information from the host computer.

Referring again to FIG. 3, it will be seen that the host computer's read/write record request is typically received by the mass memory system as a series of three comands;

1. Seek Record Block which corresponds to Receive Record Request in FIG. 3;
2. Search Block for Record which corresponds to Receive Search Record Request in FIG. 3 and
3. Read/Write Data which corresponds to Receive Read/Write Request in FIG. 3.

In response to the Seek Record Block command, which identifies the desired data block, the data controller's general purpose computer processor 13 identifies the storage/retrieval unit 15, cassette bin 21, cassette 28, tape track and tape location of the data block sought. The data controller then commands the bin position servomechanism 41 in the appropriate storage/retrieval unit to position the cassette bin containing the desired cassette so that the latter can be lifted by the cassette loader 25 into its associated tape transport 27. The data controller commands the storage/retrieval unit servomechanism to drive the bin to align the desired cassette with the transport loader by sending commands via the storage/retrieval interface control unit 43 to a magnetic particle clutch control as soon as the turntable clutch 34 of the appropriate cassette bin is engaged. The clutch control selectively actuates magnetic particle clutches 31 which transfer rotational motion from an electric motor 32 to the bin drive shaft 24 via a differential gear box 33 in the direction which will require minimum bin travel. When the bin has been positioned at the appropriate transport loader, as sensed by the position synchro geared to the bin, and has been engaged by the detent 26, the data controller commands the transport loader 25, to load the cassette into the transport 27, commands the transport read/write heads to move to the appropriate track and commands the centrally positioned tape to drive in the direction in which the desired data block is located.

The interface control unit 43 counts gaps between data blocks sensed by the read head on the transport until the gap prior to the desired block is reached. At this time, a data channel to the processor 13 is opened and without stopping the tape motion, the interface control unit 43 gates the following data block to the controller 11 and a "Device End" status signal is sent to the host computer. The latter then sends a "Search Record" command identifying the desired record within the accessed block. Upon receipt of the command, the data controller strips the desired record from the data block and sends a "Record Ready" command to the host computer to indicate the operation is complete. The host computer responds with a "Read or Write Data" command.

If the user desires to read this record, the processor transmits same to the host computer. If the user desires to write or update, the processor uses information supplied by the host computer to update the record. Then it stores this updated record in the direct access storage unit 14 and commands the appropriate storage/retrieval unit 15 to search the tape for the original block of data. Prior to the block of data arriving at the read/write head, the buffered data is returned to core from the direct access storage unit and the updated data block is transmitted to the read/write head in synchronism with the tape moving past the head. This causes the new data block to replace the previously stored data block.

STORAGE/RETRIEVAL UNIT

Figure 5:
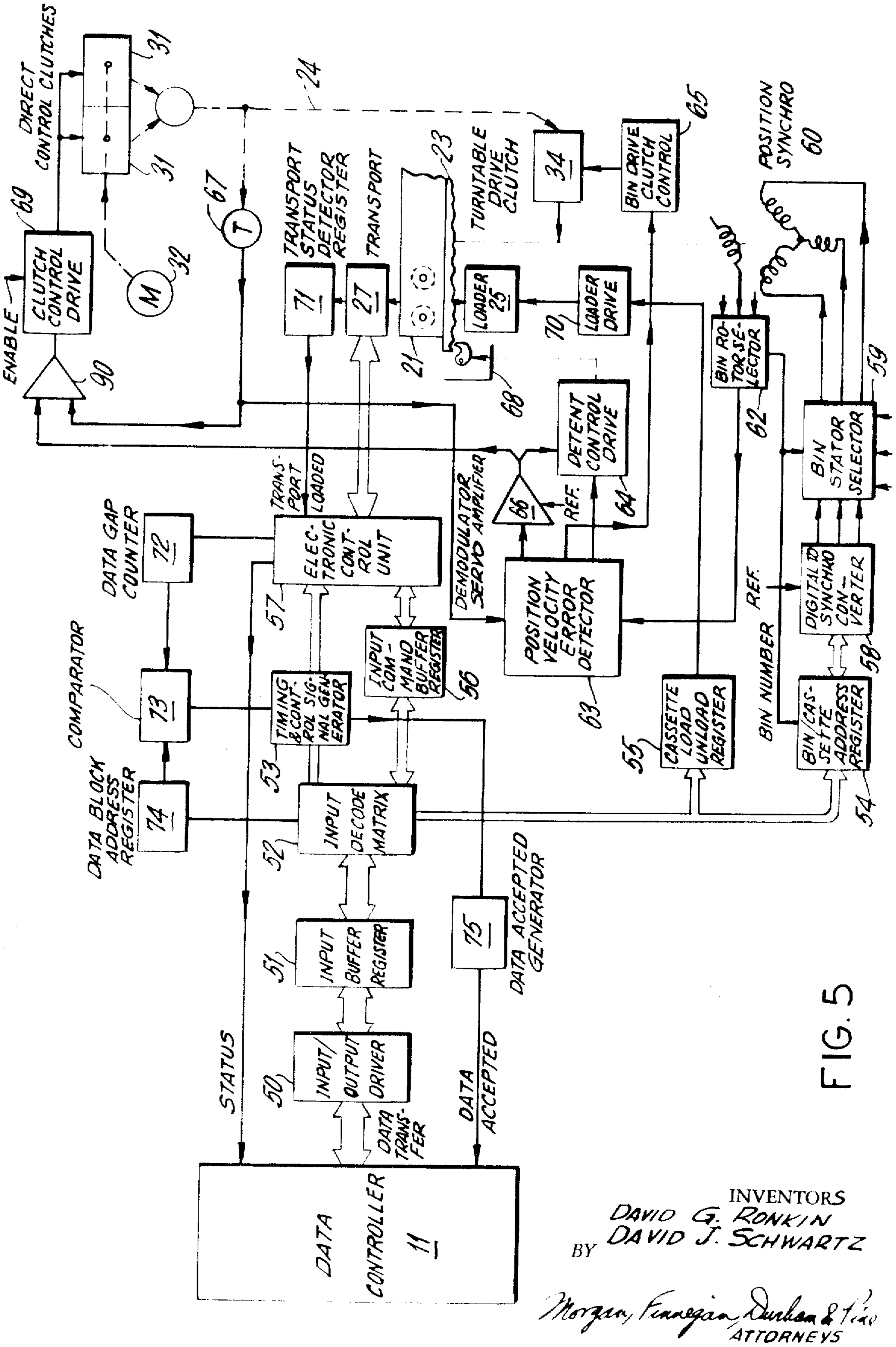
FIG. 5 is a schematic diagram illustrating data and control components associated with an addressed bin and cassette therein.

FIG. 5 illustrates the logic and control systems of a storage/retrieval unit.

The data controller 11 sends data block address information and commands regarding the storage or retrieval of data via a data transfer channel to input/output driver 50. The latter device provides an impedance match for the data transfer lines and raises the power of the address information and commands on these lines to a level sufficient to drive lines leading to the input circuits of input buffer register 51, which briefly stores and formats the address information and commands. It then applies them to input decode matrix 52 which sorts the addresses and commands and selectively routes these addresses and commands to timing and control signal generator 53, bin/cassette address register 54, cassette load/unload register 55 and input command buffer register 56 to thereby access the desired data tape location.

For purposes of clarity, only those registers and functional elements used in the accessing of a particular memory location will be described. It should be understood that the storage/retrieval unit contains four input command buffer registers which drive four electronic control units 57. Each of the latter units drives the magnetic tape transports 27 associated with two out of the eight cassette bins in a storage/retrieval unit. These units may be operated independently, i.e., while a tape from one bin is being read or written, another cassette may be positioned by bin rotation or by another transport loader.

As shown in FIG. 5, the addresses of the appropriate bin and cassette are routed by the input decode matrix 52 to the bin/cassette address register 54. That register reads the desired bin and cassette addresses and applies the digital cassette address to the digital to synchro converter 40 which generates a three wire analog signal corresponding to the required angular position of the desired bin, which will be used to align the appropriate cassette with the transport associated with each cassette bin. The address of the desired bin controls bin stator selector 59 which routes the desired analog angular bin position to the stator windings of the position synchro 60. The rotor of this position synchro is coupled to bin turntable 23 in order to sense the difference between the desired and actual positions of the bin 21.

The bin rotor selector 62 uses the bin address from bin/cassette register 54 to route the position error signal from the appropriate position synchro rotor to the position and velocity error detector 63. The detector generates control signals to the detent control drive 64, to bin drive clutch control 65 and to phase sensitive demodulator/servo amplifier 66 in sequence providing the appropriate status signals are received in the manner described below.

Upon receipt of a bin position error signal, position and velocity error detector 63 applies a disengage signal to detent control drive 64 if the position error is outside of preset limits and the velocity of cassette bin drive shaft 24, as sensed by tachometer 67, is below a preset limit. This disengage signal is applied to a solenoid which retracts normally engaged detent 68 from a scallopped wheel mounted on bin turntable 23. A Detent Disengaged status signal then enables the position and velocity error detector to apply an Engage signal to bin drive clutch control 65 which activates turntable drive clutch 34 to couple bin drive turntable pulley and timing belt to storage/retrieval unit drive shaft 24. A Bin Drive Clutch Engaged status signal then enables position and velocity error detector 63 to apply a position error signal to phase sensitive demodulator/servo amplifier 66. That device applies signals to magnetic clutch control drive 69 through servo amplifier 90, which cause magnetic particle clutches 31 to sequentially drive (error signal drives forward clutch, then bias brakes rearward clutch), resulting in rotation of drive shaft 24 in the direction which will more quickly position bin 21 to align cassette 28 with transport loader 25 and stopping of said shaft in the desired position with minimum overshoot.

Figure 10:
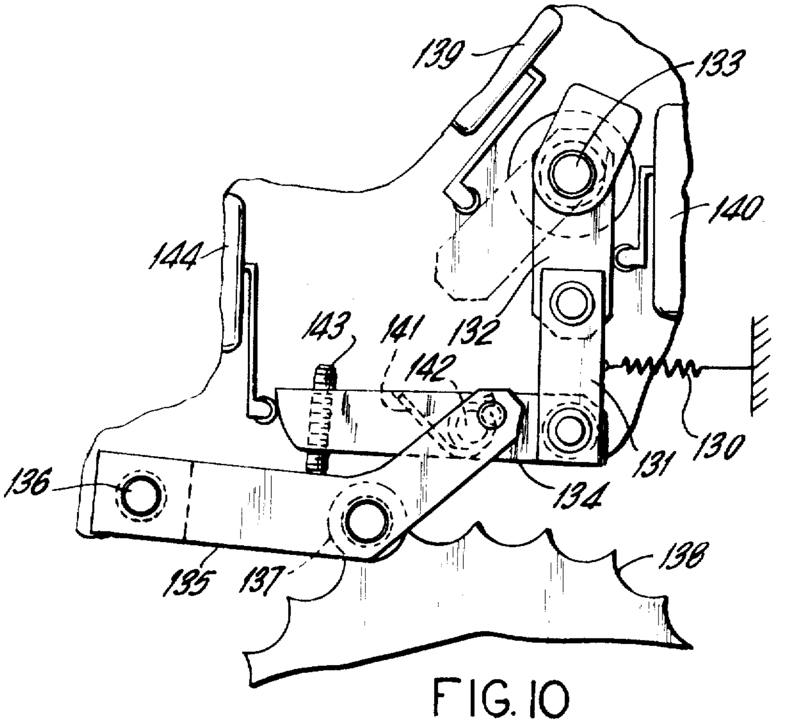
FIG. 10 is a plan view partially schematic illustrating the detent assembly.

When the turntable velocity and position error are less than maximum detent engagement limits, the position and velocity error detector 63 senses this condition and enables the controller to remove the detent disengage signal from the detent solenoid 133 (FIG. 10). The spring loaded detent 137 then engages the turntable scallop 138 corresponding to the desired cassette and finely positions and locks said turntable in the desired position. A pressure actuated switch 144 then signals the data controller that the detent is engaged (cassette aligned).

Upon receipt of a Cassette Aligned status signal the data controller sends an Alert command followed by a Cassette Load command to the cassette load/unload register 55 (FIG. 5), which reads the command and applies a Load signal to loader control drive 70. This unit applies an actuating voltage to loader 25 which lifts cassette 28 from bin 21 into transport 27. If the cassette is completely inserted into the transport, pressure actuated switches in transport 27 signal Transport Loaded to transport status detector/register 71. That register transmits the signal to the data controller (via the electronic control unit) which responds via input command buffer register/driver 56 with a Transport Select signal to the transport via the electronic control unit. If the selected transport is ready to access data, the electronic control unit 57 signals this status to the processor which responds via the input command driver 50 and buffer registers with a Transport Engage command. That command causes the transport tape drive shafts to engage free floating tape hubs in the cassette. Upon sensing proper engagement and center of tape, a Transport Drive Ready signal is sent by the electronic control unit 57 to the data controller. Meanwhile the electronic control unit has received a track address and produced a Track Select command causing the transport to position heads over the desired track. A Read Select or Write Select command is then sent by the data controller to the electronic control unit which commands the latter to select the appropriate transport amplifiers and control electronics. A Cassette Drive Direction command is then sent by the data controller to the electronic control unit which produces a Head Select command and a Cassette Drive command. The tape is then driven in the appropriate direction and the data gap counter 72 counts data gaps and compares them by means of comparator 73 with the data block address stored in data block register 74 until an identity is detected. When the latter event occurrs, comparator 73 triggers data accepted generator 75 via timing and control signal generator 53 to send a Data Accepted status signal to the data controller indicating that the upcoming data block contains the record of interest and this data block is read to the data controller for subsequent transmission to the host computer or updating as directed by the host computer.

Figure 6:
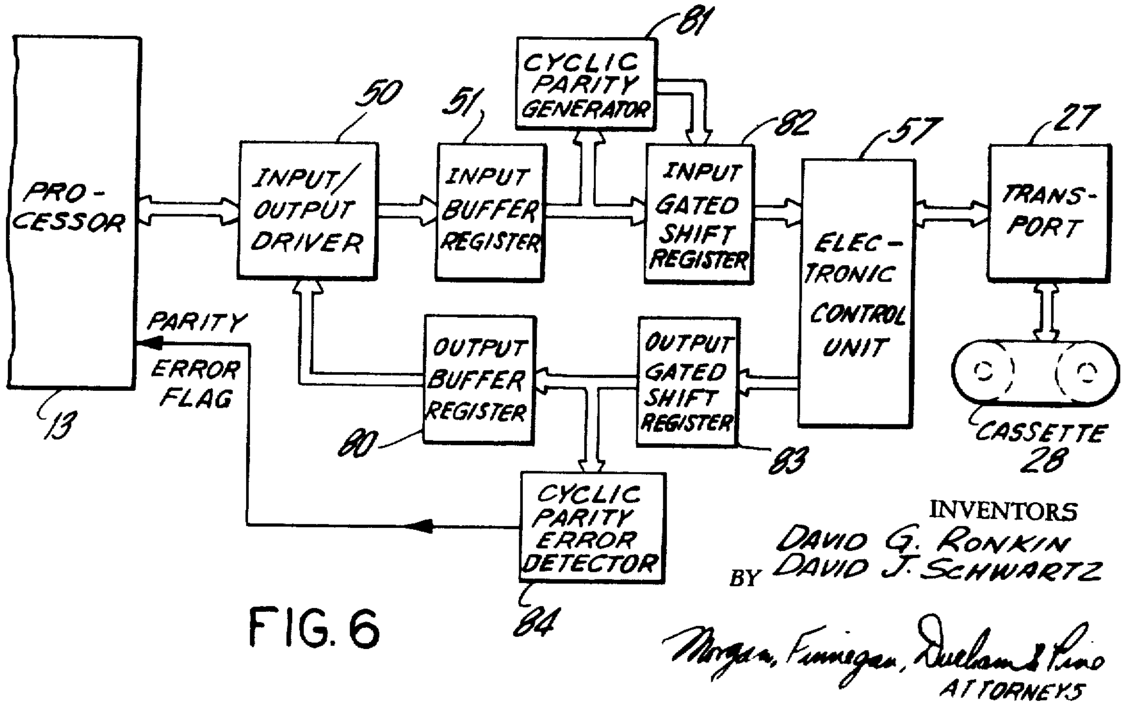
FIG. 6 is a schematic diagram generally illustrating input/output data flow between the processor and an addressed cassette.

FIG. 6 illustrates the manner in which data is transferred between the processor and a storage/retrieval unit. The data controller's processor 13 communicates directly with input/output driver 50, which in turn transmits data to input buffer register 51 and receives data from output buffer register 80. The input data is subsequently applied to the cyclic parity generator 81 and input gated shift register 82. The cyclic parity generator counts the number of logical "ones" in each byte and adds a logical "one" when necessary to make the total number of "ones" in each byte odd. The original byte, including parity, is then serially gated by input gated shift register 82 to electronic control unit 57 which writes this data via tape transport 27 onto the magnetic recording tape contained in tape cassette 28.

To recover data stored on tape, the tape transport 27 reads data blocks stored in cassette 28 and transmits these data blocks to electronic control unit 57, which routes them to output gated shift register 83 which converts this serial information to parallel format and applies it to output buffer register 80 and cyclic parity error detector 84. The latter device transmits a Parity Error Flag to the processor if an even number of logical "ones" is detected in any byte.

Output buffer register 80 temporarily stores the retrieved data and when strobed feeds this data to input/output driver 50 which transmits the requested data to the processor via the data transfer channel.

SERVOMECHANISM

As discussed in some detail already, a servomechanism is employed to position the selected cassette bin to thereby align the desired cassette with the associated cassette loader and is illustrated in FIG. 5.

Upon receipt of a multiple bit parallel bin position command from the data controller via the bin/cassette address register 54, the digital to synchro converter 58 generates a three wire analog signal which is applied to the stator windings of synchro control transformer 60 via bin stator selector 59. The rotor of this transformer is positioned by cassette bin turntable 23 in order to sense the angular position of the latter. The signal induced in the rotor coil is an error signal proportional to the difference between the commanded and actual bin positions. This signal is applied via bin rotor selector 62 to a full wave phase sensitive demodulator/preamplifier 66, explained in detail below, which utilizes the error signal and an alternating reference voltage to generate a position error and drive direction signal. This position error signal is summed with a velocity damping feedback signal generated by tachometer 67 which is geared to storage/retrieval unit drive shaft 24. This composite signal is applied to the input of power amplifier 90 which excites a clutch control drive 69. The latter, when enabled by an "Initiate Bin Positioning" command from the data controller via interface control unit 43 (FIG. 4), sequentially engages (an error signal is applied to the forward clutch and a braking bias is subsequently applied to the rearward clutch) magnetic particle clutches 31. The input shafts of these counter rotating clutches are driven by a continuously running motor 32. After the bin has been clutched to the storage/retrieval unit drive shaft 24 via a belt and pulley from the clutch output shaft as a result of a computer command to the appropriate turntable clutch 34, the differential magnetic clutch engagement causes the bin turntable assembly 23 to rotate in the direction which will more quickly position the desired cassette at the transport station.

Position error and velocity rate signals are also sensed by error detector 63 which removes the detent disengage signal from the detent control drive 64 allowing the detent to engage when position error and velocity feedback signals are below specified engagement limits.

Figures 8, 9:
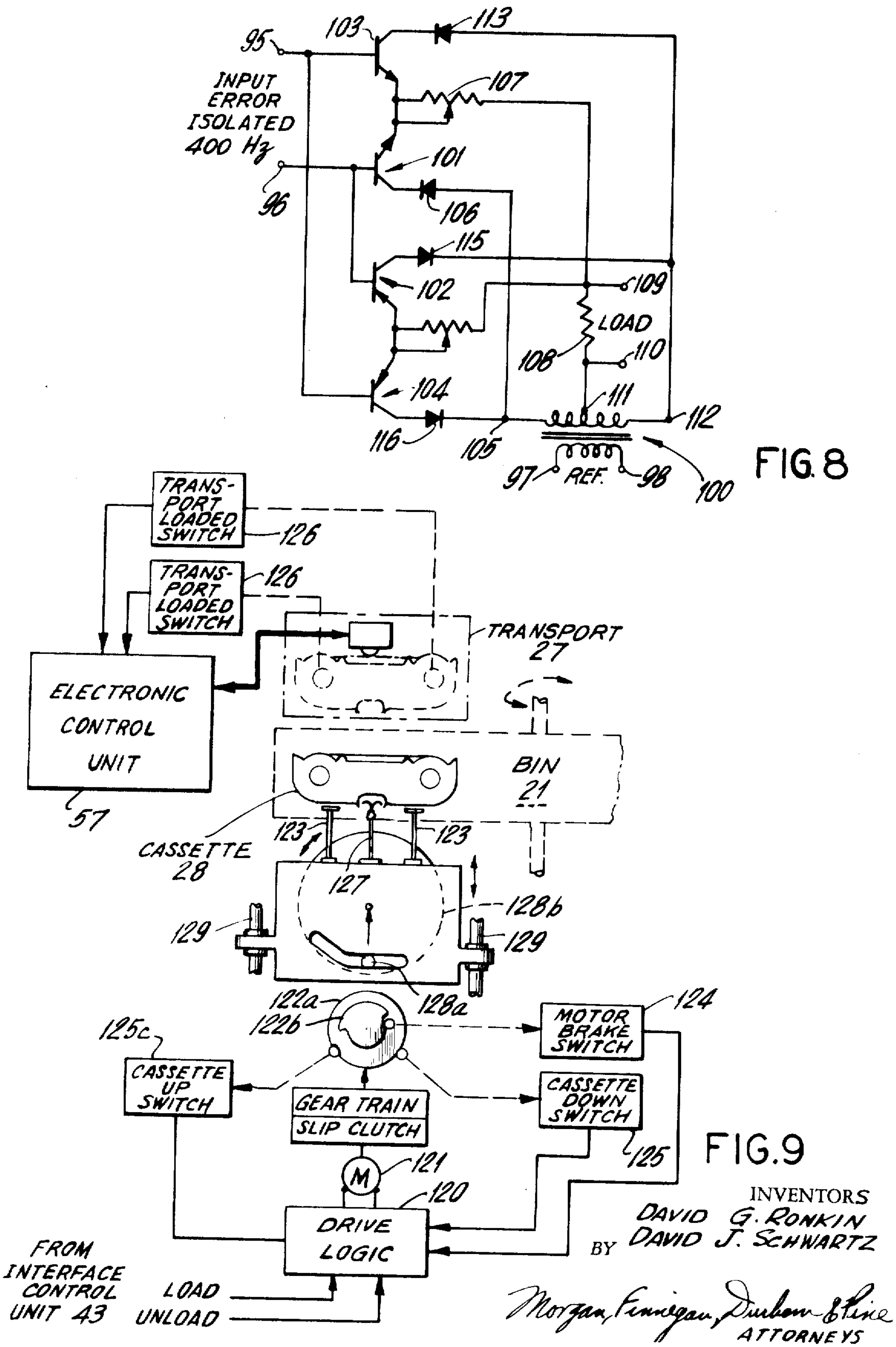
FIG. 8 is a schematic diagram of the demodulator employed in the bin position servo system.
FIG. 9 is a schematic diagram illustrating typical elements of the cassette load/unload system.

FIG. 8 is a schematic diagram of a full wave phase sensitive demodulator/preamplifier 66 which may be used in a bin positioning servomechanism. In the preferred embodiment an isolated alternating current error signal is applied to demodulator input terminals 95 and 96. If this signal is in phase with the alternating current reference voltage applied to the primary winding (terminals 97 and 98) of reference transformer 100, it will cause transistor 101 to be forward biased during the positive half cycle (terminal 95 positive) and transistors 102, 103 and 104 to be biased off. This condition will allow direct current to flow from terminal 105 of transformer 100 through diode 106, transistor 101, negative feedback resistor 107 and load resistor 108 in the direction from terminal 109 to terminal 110 and then to terminal 111 (center tap) of transformer 100.

On the negative half cycle (terminal 95 negative), an error signal which is in phase with the reference signal will cause transistor 103 to be forward biased and transistors 101, 102 and 104 to be biased off. Direct current will then flow from terminal 112 of transformer 100 through diode 113, transistor 103, negative feedback resistor 107 and load resistor 108 in the direction from terminal 109 to terminal 110 and then to terminal 111 (center tap) of transformer 100. Thus for both polarities of an error signal in phase with the reference voltage direct current will flow in the same direction through the load resistor.

Similarly, when the error signal is out of phase with the reference voltage, the positive half cycle (terminal 95 positive) of the error signal will forward bias transistor 102 and will back bias transistors 101, 103 and 104. This condition will allow direct current to flow from terminal 111 of transformer 100 through load resistor 108 in the direction from terminal 110 to terminal 109 and then through negative feedback resistor 114, transistor 102, diode 115 and back to terminal 112 of transformer 100.

The half cycle (terminal 95 negative) of an error signal out of phase with the reference voltage will forward bias transistor 104 and backward bias transistors 101, 102 and 103. This condition will cause direct current to flow from terminal 111 of transformer 100 through load resistor 108 in a direction from terminal 110 to terminal 109 and then through negative feedback resistor 114, transistor 104, diode 116 and back to terminal 105 of transformer 100.

Thus signals applied to the demodulator input which are out of phase with a voltage applied to reference transformer 100 will cause direct current to flow through load resistor 108 in the same direction during both polarities of the signal. It will be noted that this direction is opposite than that produced by a signal which is in phase with the reference voltage.

Therefore, the four transistor circuit described above performs a full wave, phase sensitive demodulator function. In addition, the gain resulting from the use of transistors in this circuit enables the latter to perform a servo preamplifier function without additional components.

CASSETTE LOADER

A full description of the cassette load/unload system is set forth below with the aid of FIGS. 7A, 7B, and 9. Referring first to FIG. 9, it will be seen that the Load and Unload commands are routed from interface control unit 43 to drive logic 120 which applies drive voltages to motor 121. During the load cycle, the motor drives cam 128 through a gear train which lifts cassette 28 from bin 21 into transport 27 by means of push rods 123.

Motor brake switch 124 is activated by cam *122b* to slow the cassette motion by removing the drive voltage and shorting the motor control winding as the cassette approaches the transport. Cassette Up switch *125c* is actuated by cam *122a* and indicates to drive logic 120 that the cassette has been raised into the transport 27. Transport Loaded switches 126, activated by pressure sensitive contacts, signal the electronic control unit 57 that the cassette has been loaded into the transport.

Upon receipt of an Unload command from interface control unit 43, the cassette which was previously loaded into the transport is retracted by pull springs 127 which engage notches in cassette 28. Rotation of cam 128, to which pull springs 127 are attached, is slowed by actuation of motor brake switch 124 removing drive voltage and shorting motor control winding. The cam rotation coasts to a stop while lowering the cassette until it bottoms in its slot in bin 21 at which point the pull springs 127 disengage from the cassette and Cassette Down switch 125, actuated by cam *122a* signals drive logic 120 that the cassette has been lowered into the bin.

Figures 7A, 7B:
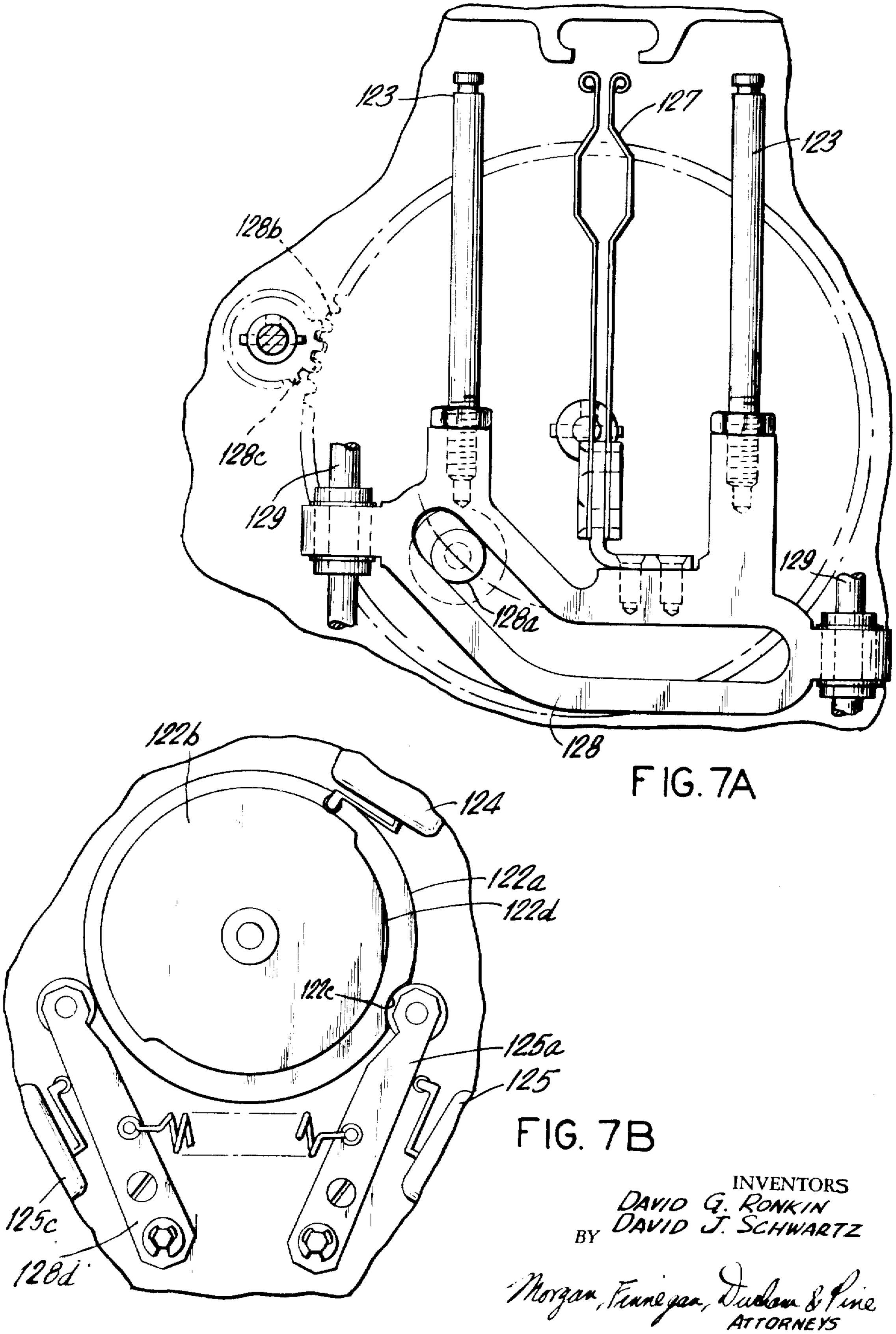
FIG. 7A and 7B are elevational-sectional and plan views respectively of the transport loader.

FIG. 7A is a sectional view of the cassette loader assembly 25. Referring to this figure the operation of the loader mechanism will be further explained.

The loader mechanism consists of two push rods 123, and a cassette engaging spring device 127 which are connected to two guides 129, and a lift cam 128. The motion of the loader is controlled from a cam roller 128*a*, attached to a gear 128*b*. The gear is driven by a motor which is connected to a gear 128*c* through a spring loaded clutch designed to limit the torque applied to the gearing. The motor is dynamically controlled for braking. When Cassette Load is commanded, the cam motion consists of an initial pre-travel that moves the push rods and spring device up to the cassette. At this point the spring expands allowing positive connection to be made with the cassette 28. The lift cam 128 is designed to slow the initial contact with the cassette. After this point the cam roller travels on a linear path relative to the cam causing harmonic motion for the main loading path.

As shown in FIG. 7B, the face side of the transport loader assembly has dual cams 122*a* and 122*b* which are pinned together and fastened to the lift cam drive gear. The larger diameter cam surface 122*a* is notched at one point on its periphery 122*c* to sequentially admit one of two cam rollers mounted on spring loaded pivoted cam follower arms 128*d* and 125*a*. Each of the arms support rollers of switch actuators which cause contacts in switches 125*c* and 125 respectively to transfer when the cam rollers enter or leave the larger diameter cam notch 122*c*.

When the cam 122*a* is in the position shown in FIG. 7B, the roller cam follower arm 125*a* is engaged in the outer cam notch allowing the cam follower arm tension spring to retract cam follower arm 125*a*. This retraction allows the actuator arm on switch 125 to extend which in turn causes said switch to close contact. This contact closure indicates that the loader push rods 123 and cassette engagement spring fingers 127 are in the down position.

When the loader receives a signal to load a cassette, the dual cam advances in a counter clockwise direction as the lift cam drive gear shown in FIG. 7A causes the lift cam to elevate the loader push rods and cassette engagement fingers. As the loader approaches the elevated position, the roller on the actuator of motor brake control switch 124 descends to the lower surface 122*d* of the smaller diameter cam 122*b*. This movement allows the actuator of the latter switch to extend. This switch operation removes drive power and short circuits a control winding in the loader drive motor causing a counter electromotive force to brake the drive motor. The dual cams decellerate with the lift mechanism until the latter is in the full up position as indicated by seating of the cam follower roller of arm 128*a* in the outer cam notch 122*c* with resultant closure of the contact of switch 125*c* thus signaling "loader up" to the data controller.

The retraction cycle proceeds similarly with the cams rotating in clockwise rotation due to the motor leads being reversed for the unload cycle. As in the load cycle, the braking switch 124, operated when its roller reaches the lower surface 122*d* of cam 122*b*, serves to remove motor drive power and short the motor leads to provide dynamic braking.

BIN DETENT ASSEMBLY

As outlined above in connection with the discussion of FIG. 5, a detent mechanism is provided to accurately position and lock the cassette bin at the desired angular position. As the servo-mechanism drives the cassette bin to the approximate angular position the angular positioning rate is reduced. Both the position and rate are monitored until they are within the detent engagement limits. At that point, the bin drive clutch 34 is disengaged and the rotary detent solenoid 133 is de-energized.

Referring to FIG. 10, tension spring 130 then rotates detent linkage member 131 to the position shown which also rotates detent arm 132 and the shaft of detent solenoid 133 from the (dashed) energized position to the de-energized position shown. Simultaneously, the movement of linkage 131 rotates linkages 134 and 135 clockwise about linkage pivot 136 to engage detent roller 137 in the appropriate valley of bin turntable scallopped ring 138 (segment shown). The center of the valley corresponds to the center line of the cassette 28 which is being accessed. The tension of spring 130 on the detent linkage causes the detent roller 137 to seek and remain in the lowest position of the scallop which also corresponds to the desired bin position.

Switches 139 and 140 sense the position of the detent and indicate whether the detent solenoid is energized or de-energized respectively.

Normally linkage members 134 and 135 function as a unit. In the event that the roller 137 does not come to rest in the valley of the scallop, a torsion spring 141 and pivot 142 are provided to allow relative motion between linkages 134 and 135 which is sensed by switch 144. Set screw 143 is provided to adjust the normal relative positions of the latter two linkages.

When it is desired to move the bin to a new position, the rotary detent solenoid is energized, lifting the detent roller 137 away from the bin turntable scallop ring 138 by means of the linkages described above. The bin drive clutch 34 is then engaged to rotate the cassette bin.

TRANSPORT HEAD ASSEMBLY

Figure 11:
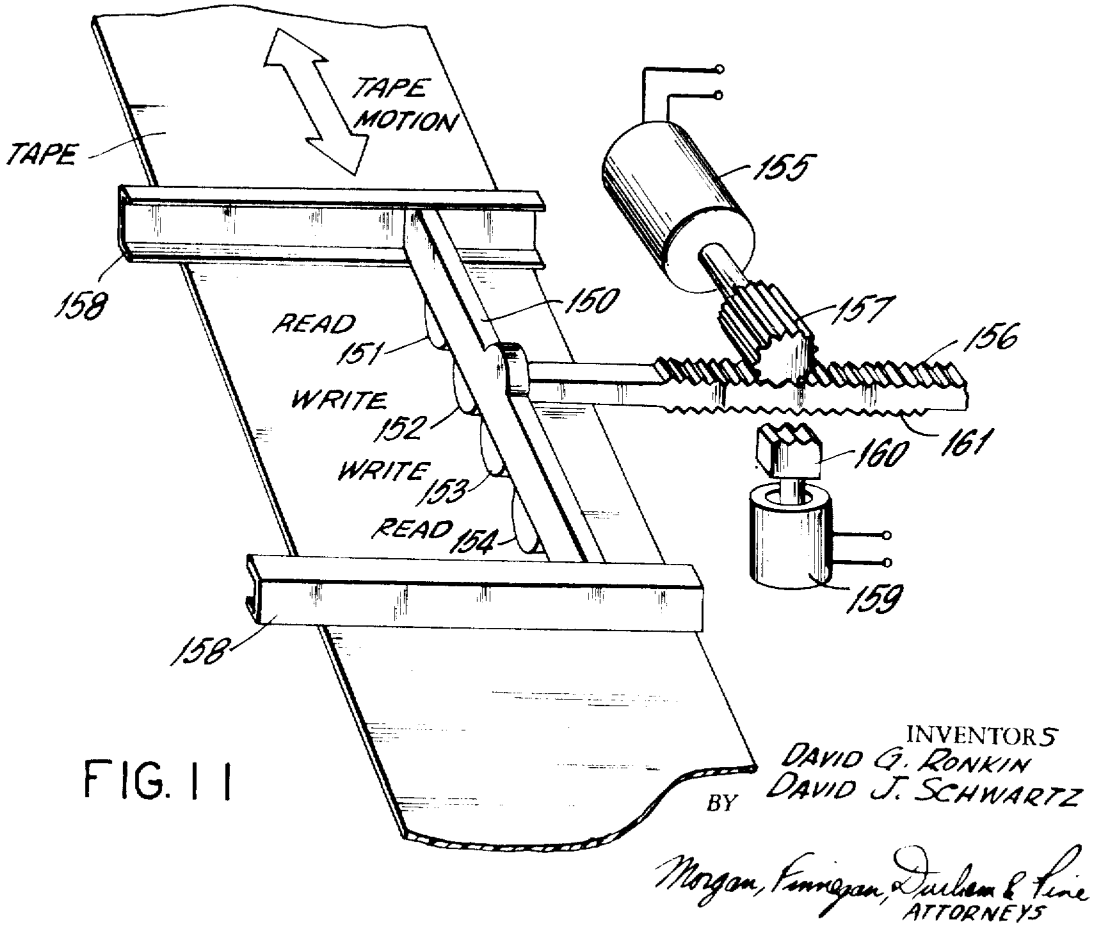
FIG. 11 is a perspective and schematic drawing illustrating the tape transport head assembly.

As shown in FIG. 11 the transport head assembly consists of a head carriage 150, on which four magnetic record/reproduce heads 151, 152, 153 and 154 are serially mounted parallel to the direction of tape motion. In the preferred configuration these heads function to read, erase, write and read respectively. Thus for a given tape direction (e.g., downward in FIG. 11) the first head 151 to encounter a signal on the tape performs a read before write or search operation. The second head 152 erases unwanted data, the third head 153 writes new data and the fourth head 154 verifies the newly written data; thus only one tape pass is required to read, erase, write and verify data.

The stepper motor 155 drives a head positioning rack 156 by means of pinion 157 to position the head carriage 150 in any of 16 discrete positions across the tape corresponding to one of 16 data tracks. Head stack guides 158 are provided to maintain the head carriage parallel to the direction of tape motion. Solenoid 159 actuates head detent tooth assembly 160 to engage teeth 161 cut in the side of the head positioning rack 156 to finely position and secure the head carriage 150 over the selected track upon removal of power from the head stepper motor.

TAPE CASSETTE

Figure 12A:
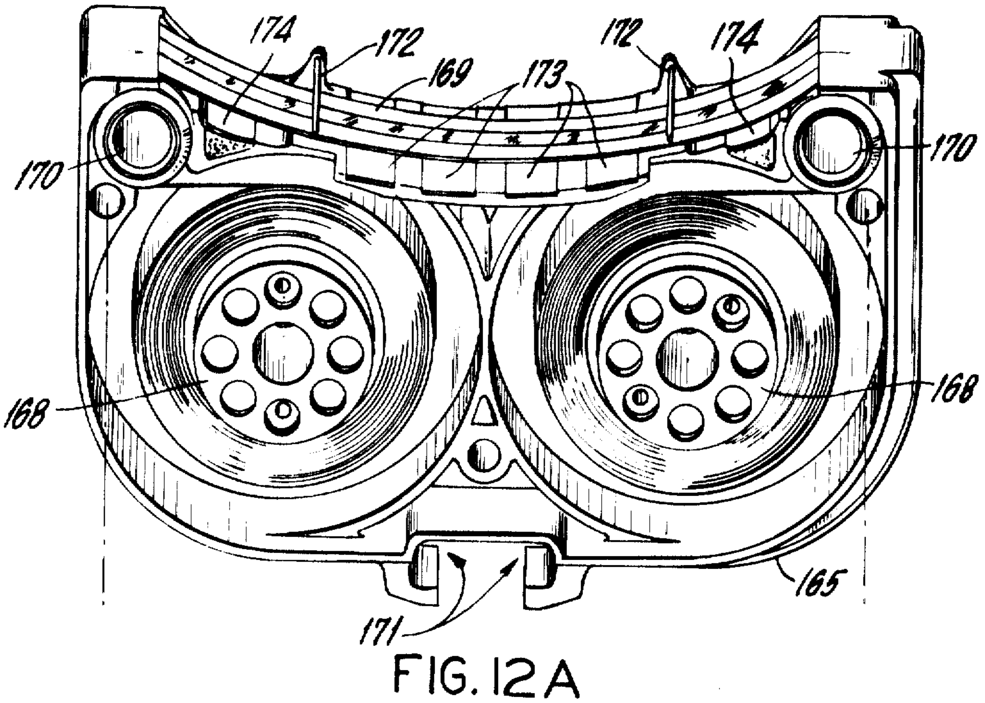
FIGS. 12A and 12B are plan and perspective drawings respectively of the tape cassette.
Figure 12B:
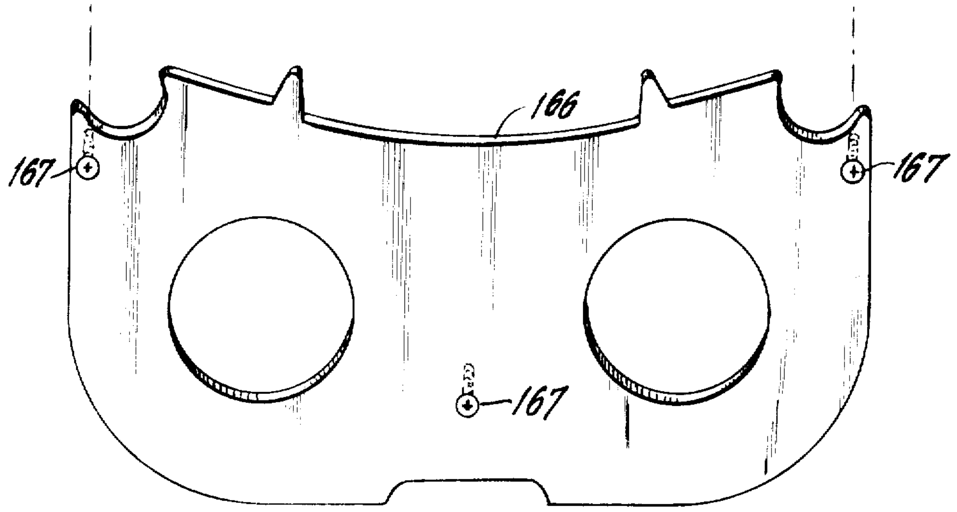

The magnetic tape cassette utilized in the cassette bins consists of the assembly illustrated in FIGS. 12A and 12B. The assembly consists of a cassette shell 165, a floating side plate 166 retained by spring loaded screw posts 167, free floating reels 168 on which is wound centrally positioned magnetic recording tape 169, and free floating capstan/guide rollers 170.

The cassette shell is provided with recesses 171 designed to engage the cassette loader engagement springs 127 previously described in connection with FIG. 9. It also has mounting lugs for tape guide pins 172 under which the tape passes in close proximity to four transversely mounted high permeability head shields 173. Metal reflective surfaces 174 are also mounted on this shell in order to reflect light beams generated in the tape transport back to transport mounted photocells when clear windows indicate Center-of-Tape (C.O.T) (Shown in FIG. 12A by a clear window along the center position of the tape) or End-of-Tape (E.O.T.) (indicated by another clear window transversley offset from the C.O.T. clear window).

The free floating reels, capstan/guide rollers, side plate and the tape are accurately positioned relative to a precision banking transport surface adjacent to the side plate of the cassette in the following manner. After the cassette has been loaded into the transport, the transport is commanded to engage the cassette drive mechanism. In response to that command a solenoid actuated plate presses the three spring loades screw heads and thereby the floating sideplate, the tape reels and the free gloating capstan/guide rollers against the banking surface, the drive/brake shafts and the capstan/guide roller shafts respectively of the tape transport. The transport then drives the tape in the desired direction until the photocell senses E. O. T. or is commanded to stop, at which time the tape is automatically driven to C.O.T.

The use of free floating capstan/guide rollers 170 in the cassette in combination with capstan/guide roller shafts extending from a precision banking transport results in several important advantages. Since the capstan/guide rollers are floating, the normally tight manufacturing tolerances may be relaxed and the cassettes may be made by relative inexpensive processes. On the other hand, the use of a precision banking transport allows the use of higher density (bits per inch) recording techniques than was formerly possible with previous cassette-type tape storage schemes.

In the preferrec embodiment, the individual cassettes contain 260 recordable feet of ½ inch magnetic tape. Data are stored on the tape at a density of 8,000 bits per inch (BPI). The transport drives the tape at a speed of 150 inches per second (IPS) and at a gap distance of 0.2 inches. Thus a single cassette is capable of storing 356 million bits.

RECORD/REPRODUCE SYSTEM

After the addressed cassette bin has been properly positioned, the desired cassette extracted therefrom and engaged by the appropriate tape transport, and with the head carriage positioned over the selected track and the tape being driven towards the selected data block, the system is almost ready to perform the read/write function.

The circuitry necessary to accomplish this function is contained in part in an electronic control unit 57 with the balance in a tape transport 27. As was set forth earlier, a single electronic control unit is shared by two tape transports.

Figure 13:
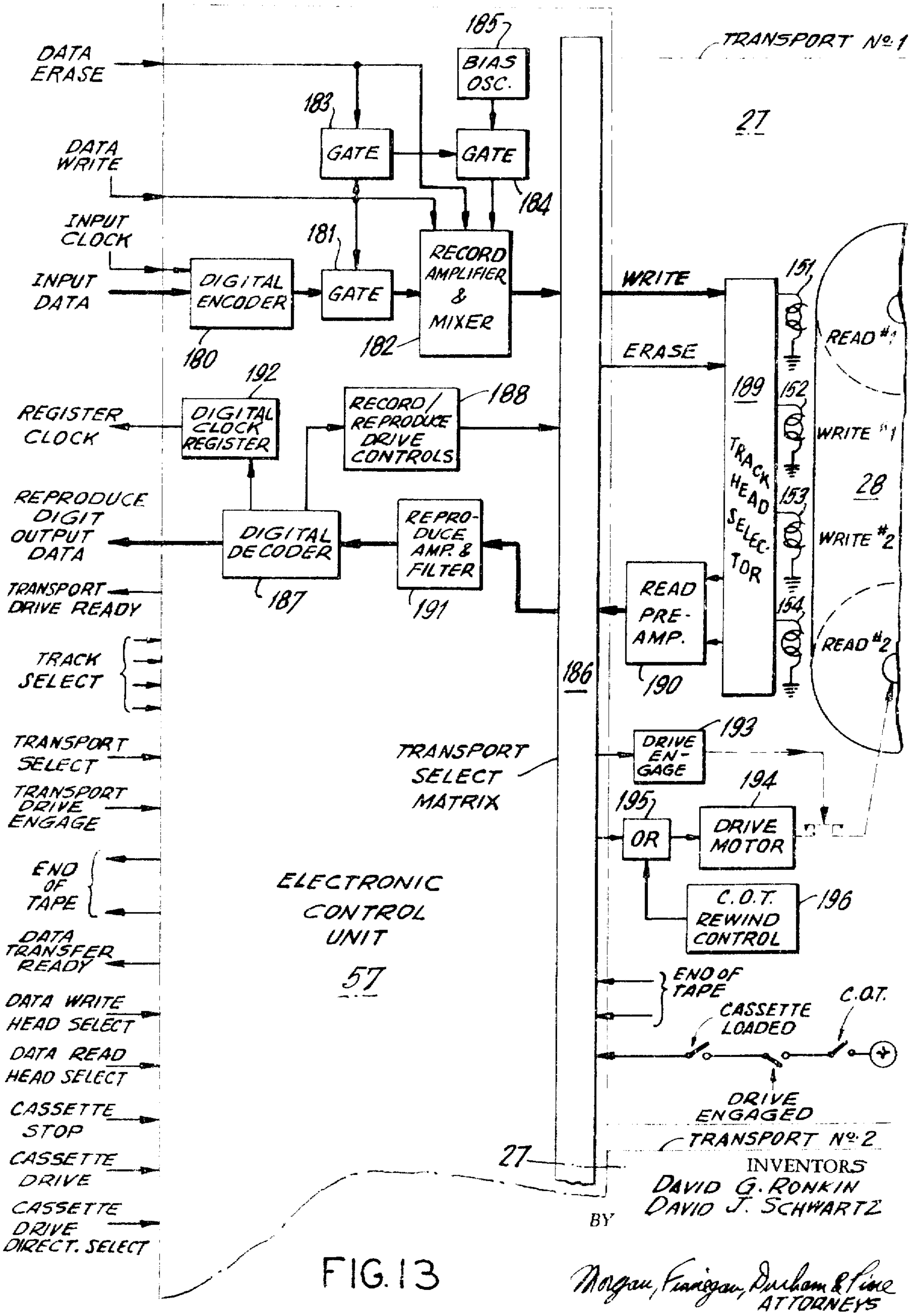
FIG. 13 is a schematic diagram illustrating additional aspects of the record/reproduce system as implemented in the electronic control unit and a selected transport.

FIG. 13 is a schematic diagram of the Record/Reproduce System. The incoming data is clocked into a digital encoder 180. Upon receipt of a Data Write command, this data is passed by gate 181 to record amplifier and mixer 182. The Data Write command is also routed via Or gate 183 to control gate 184 which applies the output of bias oscillator 185 to record amplifier and mixer 182. Transport select matrix 186, having previously received the desired bin, cassette and tape address via the electronic control unit's digital decoder 187, and via record/reproduce drive control electronics 188, routes the encoded input data to that transport which has received the cassette containing the designated data block storage location which is located by counting data block gaps sensed by reproduce head 151 (see FIG. 5). Without stopping the tape the old data in the designated block is erased by an erase signal to record head 152 and the data is then applied via track head selector 189 to write head 153 (assuming downward tape motion) and the data is then written into the desired storage location. Reproduce head 154 senses the newly written data and applies it to read preamplifier 190 via track head selector 189. This data is then routed through transport select matrix 186 to reproduce amplifier and filter 191. The latter applies the amplified and filtered data to digital decoder 187 which routes this data to the processor which compares it with the input data to insure that an accurate record was placed on the tape.

Similarly, upon receipt of a Read command and data block address from the processor, the electronic control unit causes the transport to appropriately position its heads and to drive the tape to the data block location, which is ascertained by counting data block gaps via reproduce head 151. Reproduce head 154 senses the data (assuming downward tape motion) and applies it to read preamplifier 190 via track head selector 189. The transport select matrix 186 then routes this data to the processor which transmits it to the direct access storage unit for transfer by the data controller to the host computer.

Data Erase commands from the processor are applied to Or gate 183 of the electronic control unit which enables application of the output of bias oscillator 185 via gate 184 to record amplifier and mixer 182. The latter device applies the erase signal via transport select matrix 186 to the appropriate transport and via track head selector 189 to the appropriate track and to record head 152 (assuming downward tape motion). Meanwhile the tape has been positioned to the location of the data to be erased by counting data gaps via reproduce head 151 as previously explained in connection with the discussion of FIG. 5. Without stopping the tape, the erase signal is applied and erases the data previously stored at this tape position.

In the Reproduce mode of operation digital clock regenerator 192 reconstitutes the timing clock frequency which was originally applied to digital encoder 180 when the data was recorded and routes this clock frequency to the processor.

The electronic control unit routes actuating commands to the transport unit's drive engage logic 193 and drive motor 194. In the latter instance, the command is routed through Or gate 195 which can also route motor drive commands from Center of Tape controller 196 to drive motor 194.

Physically, the Record/Reproduce system is subdivided into three separate component parts: (1) an electronic control unit 57, (2) a cassette transport 27, and (3) the magnetic tape cassette 28.

The electronic control unit provides the interface for all power, control and data signals required for the recording and reproduction of serial clocked NRZ (non-return to zero) digital data to and from magnetic tape cassettes and is remotely controlled by digital input commands from the data controller.

The electronic control unit contains both the digital data encoder 180 and decoder 187 as well as all record/reproduce and tape drive speed control electronics that can be economically separated from the cassette transport 27 so as to allow sequential time sharing of this equipment with as many as two remotely located transports. The electronic control unit accommodates as many as two remote transports without the necessity of any dummy loads should less than the maximum number of transports be desired, and does so with no degradation of performance.

All record-reproduce requirements are met for a single recording track with track head selection and positioning being performed in the selected transport by means of commands from the electronic control unit. Separate four bit digital commands are supplied to the electronic control unit for track head selection and positioning within each cassette transport.

The electronic control unit immediately routes to each transport the Track Selection command and the Cassette Drive Engage/Disengage command. However, control signals corresponding to Transport Select, Read Head Select, Write Head Select, Drive Direction, Drive and Stop are only furnished to the transport which has been selected to record or reproduce. Status signals continuously supplied by the electronic control unit for each transport include Drive Ready and E.O.T.

Upon receipt of a cassette Transport Select command, the electronic control unit selects one of the two possibly connected transports to process in a record/reproduce mode. The Drive Direction command and the Drive Control command are then forwarded to the selected transport for activation of the record/reproduce cycle.

The single track record mode is controlled by the Data Write command which identifies the presence of data on the digital data input line. Input data rate is 1.20 megabits/sec. max. The encoding scheme is such that the digital input data is reproduced and re-clocked with a regenerated clock signal derived from this single track record. No additional timing tracks are required.

An alternate command, Data Erase, is capable of altering previously recorded digital data such that a definable no-input-data data gap is detected in the reproduce mode. The erase function is capable of being performed in either direction.

In the reproduce mode the self-clocking reproduce electronics decode the recorded data and transmit the originally recorded NRZ digital data re-clocked with the regenerated clock signal obtained from the recorded data. The regenerated digital clock signal itself is also supplied as an output. The self-clocking decoding scheme also has the capability of distinguishing between the presence of previously recorded digital input data on the tape and the presence of a recorded no-input-data data gap. A Data Gap pulse is generated by the digital decoder to indicate the presence of such a data-gap and it is also transmitted. As described earlier, these data gap pulses may be counted to determine the location of data blocks on the tape.

Upon insertion of a cassette into the transport from a cassette bin the transport is commanded to engage the cassette drive mechanism. The transport signals the processor via the electronic control unit that a cassette has been inserted, that the tape drive mechanism has been engaged satisfactorily, and that the cassette tape is currently positioned at the 130 ft. mark (center-of-tape) which then permits bidirectional search of the tape. Satisfactory fulfillment of these three conditions is indicated by a Drive Ready status signal which is sent to the processor via the electronic control unit.

Subsequently, a cassette Drive command is sent to the transport, the removal of which automatically activates the rewind to center-of-tape cycle and sets a digital output. The transport is driven at a servo controlled speed of 150 inches per second and the transport mechanism operates in both the forward and the reverse directions. The cassette is driven by the tape transport and controlled by a fast response servo-controlled encoder disc tachometer on the capstan. The reference frequency therefor is generated by a crystal controlled oscillator (not shown) located in the electronic control unit. Activation of the cassette Stop command stops the cassette drive within 0.2 seconds of receipt of this command, over-riding any automatic drive direction reversal features. The cassette drive remains stopped until this command is removed, at which time servo-controlled operation of the cassette is resumed in accordance with the cassette drive and direction commands applied at time of removal.

STORAGE/RETRIEVAL UNIT CONTROL LOGIC DESCRIPTION

Figure 14A:
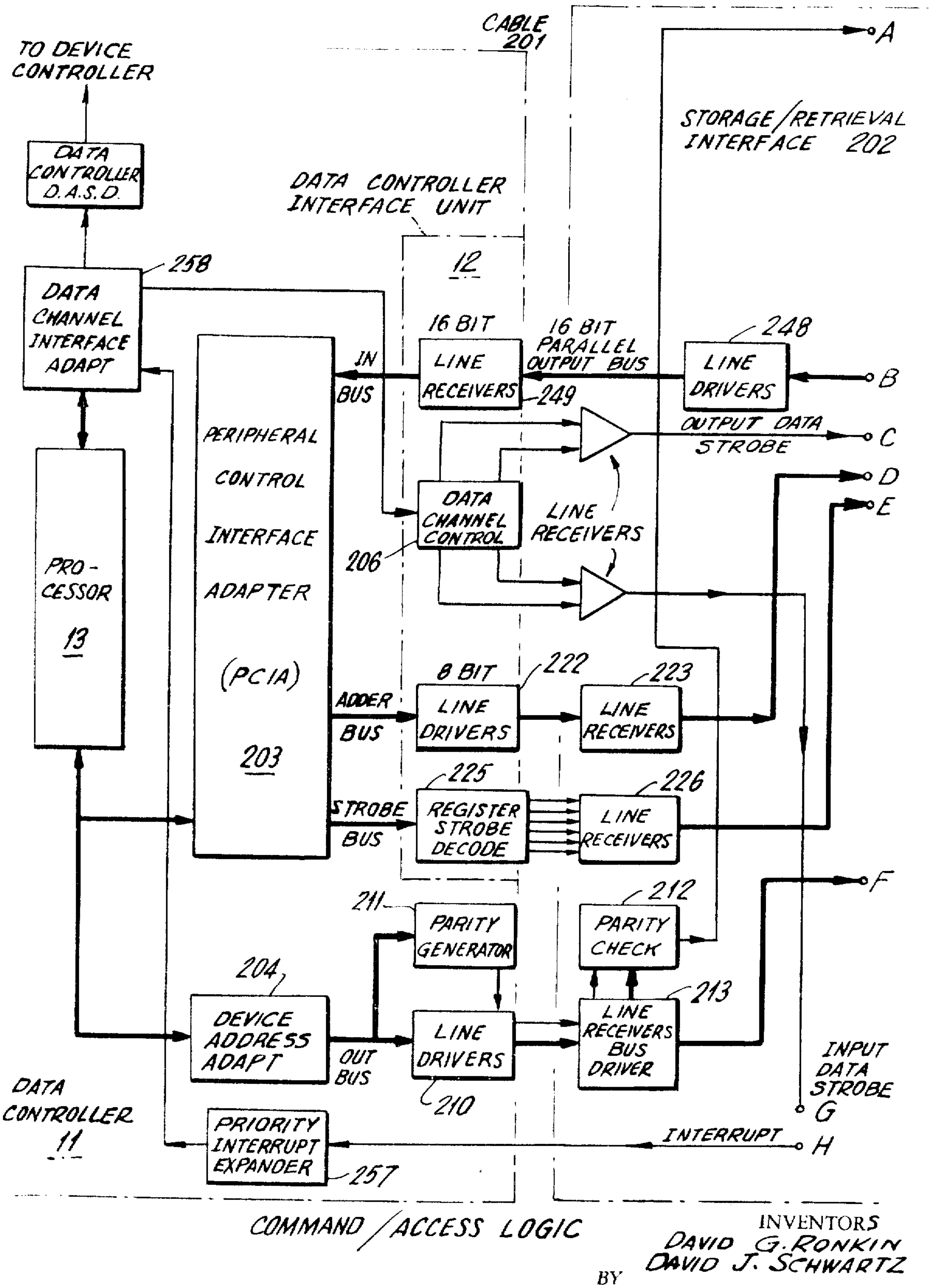
FIGS. 14A and 14B are schematic diagrams of the logic and control circuitry used to effect read/write operations.
Figure 14B:
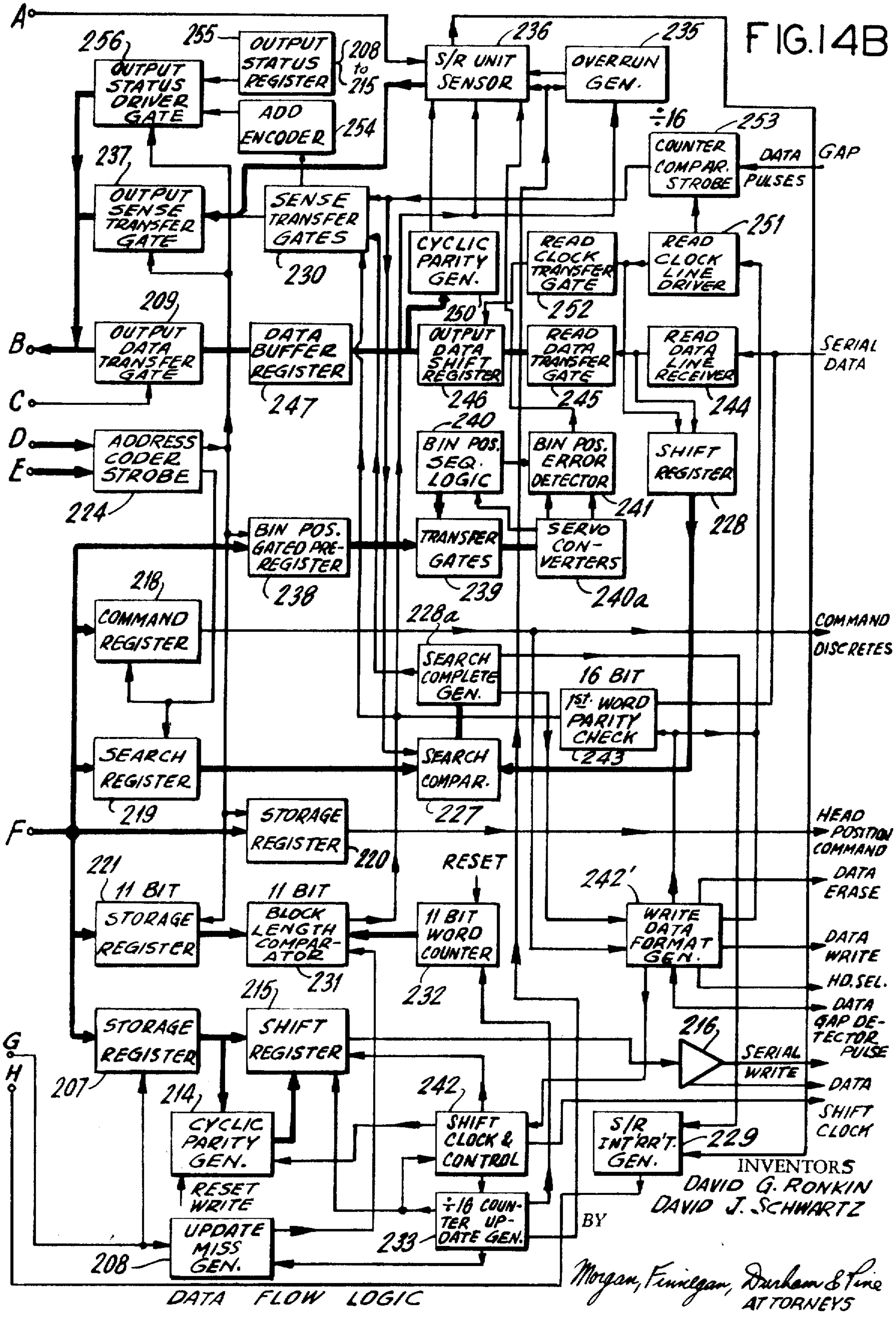

FIGS. 14A and 14B are simplified schematic-functional block diagrams of the storage/retrieval unit control logic, which illustrate the command/access logic and data flow logic respectively.

Referring to FIG. 14A it will be seen that there are three primary functional areas including (1) the data controller 11, (2) a cable interface 201 and (3) the storage/retrieval unit interface 202. Associated with the data controller are the peripheral controller interface adapter (PCIA) 203 and the device address adapter (DDA) 204.

The PCIA is the interface unit between the processor 13 and the data controller interface unit 205 for data flowing from the storage/retrieval unit to the processor and for address and timing strobes from the processor to the storage/retrieval unit. The DDA 204 is the interface unit for data flowing from the processor to the storage/retrieval unit. The data controller also contains data channel control 206 which provides input data strobes for the 16 bit input data gated preset storage register 207 (FIG. 14B) and the update miss generator 208 (FIG. 14B). The data channel control 206 also provides an output data strobe for the 16 bit output data transfer gates 209 (FIG. 14B).

The following description outlines in detail the manner in which input data is received from the processor, processed by the storage/retrieval unit interface control logic and routed to tape storage via the electronic control unit 57.

Data in 16 bit parallel format is received by the storage/retrieval unit from the processor via device address adapter 204 which feeds line drivers 210 and parity generator 211. The latter device adds a parity bit when required to make the total number of logical "ones" in the parallel data words odd and the parity information is routed to line driver 210 for transmission via cable interface 201 to the storage/retrieval interface unit line receivers and bus drivers 213. The received data is routed to parity checker 212 for verification of transmission accuracy and to 16 bit input data gated preset storage register 207. The latter device routes this data to cyclic parity generator 214 for addition of parity information and to 16 bit input data gated shift register 215. The latter unit converts the data and parity information to serial format utilizing timing and control pulses from shift clock and control 242 and routes this data including parity via amplifier 216 to the electronic control units 57 for storage on tape.

The parallel format input data is also routed by line receiver and bus drivers 213 to 16 bit head position gated preset registers 220, 11 bit block length gated preset storage register 221 and 16 nine bit bin position gated preset registers 238 for extraction of tape transport commands, search comparison, head positioning commands, block length verification and bin position commands respectively. These devices also receive storage addresses from the processor via peripheral controller interface adapter 203, 8 bit line drivers 222, eight bit line receivers 223 and address coder and strobe register 224. In addition, they receive timing strobes from the processor via PCIA 204, register strobe decoder and line drivers 225, line receivers 226 and address coder and strobe generator 224.

The registers referred to in the preceeding paragraph extract process and route the received data, command and control information in the following manner:

a. Command register 218 extracts transport commands from the parallel input data words and transmits discrete commands to the tape transports via electronic control unit 57.

b. Sixteen bit search register 219 routes the search word to search comparator 227 which matches it to data read from tape via electronic control unit 57 and eight divide by 16 data gap counters 253 and also via read data line receivers 244 and 16 bit shift register 228 to detect End of Block and Search Match conditions which trigger search complete generator 228*a*.

c. Eight five bit head position gated preset registers 220 extract head position commands from incoming data bus route them to tape transports via electronic control unit 57.

d. Eleven bit block length gated preset storage register 221 routes input data to 11 bit block length comparator 231 which compares input data blocks with the output of 11 bit word counter 232. The latter device is driven by pulses from divide by 16 counter and update generator 233 which produces an output pulse for every 16 input pulses from shift clock and control 242. The 11 bit block length comparator sends block length information to overrun generator 235 and to six bit storage/retrieval unit sensor 236.

e. Eight nine bit bin position registers 238 feed bin positioning commands to transfer gates 239 which, under control of bin position sequence logic 240, apply then commands to servo converters 240*a*. The latter unit generates analog position commands which are combined with bin position feedback signals in a synchro control transformer (not shown) to generate an error signal to bin position error detector 241 which relays the position error condition to bin position sequence logic 240 and to six bit storage/retrieval unit sensor 236. The sensor relays data control information to storage/retrieval unit interrupt generator 229 and signals to the processor via 16 bit output sense transfer gates 237, line drivers 248, line receivers 249 and peripheral controller interface adapter 203.

f. The write data format generator 242 provides appropriate signals to the electronic control unit for data erase, write and head select functions.

Similar logic is employed to retrieve stored data from tape. In response to a read command received by the electronic control unit from the processor via device address adapter 204, line drivers 210, line receivers 213 and command registers 218, serial data is read from tape storage by the transport under control of the electronic control unit and routed to eight first word 16 bit parity checkers 243 which send parity information to 6 bit storage/retrieval unit sensor 236. Serial data is also routed by read data line receivers 244 to read data transfer gate 245. Simultaneously, eight read clock line drivers 251 apply electronic control unit clock pulses from write data format generator 242 to read clock transfer gate 252. Output pulses from the latter device shift the serial data from read data transfer gate 245 into 16 bit output data shift register 246 which converts the data to parallel format and applies it to 16 bit data buffer register 247 and also to 16 bit cyclic parity generator 250, which generates a discrete output indicating that the data block was correctly read and routes this discrete signal to the six bit storage/retrieval unit sensor 236. Data buffer register 247 routes output data via 16 bit output data transfer gates 209 to the processor via 16 bit line drivers 248, line receivers 249 and peripheral controller interface adapter 203 when the transfer gates are strobed by data channel 206.

In addition to the data extracted from tape storage, the storage/retrieval unit produces cassette transport unit status (identity/go-no go) signals and upon processor request, transport unit sense (detailed condition) information. This information is assembled and transmitted by the storage/retrieval unit logic in the following manner. Ten bit transport sense transfer gates 230 receive parity check information from parity checkers 243 and parity check strobe pulses from eight divide by 16 counters comparator strobe generators 253. These gates also receive End Block/Search Match information from search complete generator 228a. The transport sense transfer gates then transmit cassette transport unit identity and go-no go condition to add encoder 254 which together with 16 bit output status register 255 provide transport condition, parity and timing status to 16 bit output status transfer gates 256 for transmission to the processor before and after data blocks via 16 bit line drivers 248, interface cable 201, 16 bit line receivers 249 and peripheral controller interface adapter 203.

In the event that an error is indicated in the status message, the processor then requests storage/retrieval unit sense information to be gated onto the data output bus. In addition to providing storage/retrieval unit sense information consisting of word parity, cyclic parity, bin position error, counter output and block length overrun (the latter via block length overrun generator 235), the storage/retrieval unit sensor 236 transmits a Function Interrupt signal to storage/retrieval unit interrupt generator 229, which also receives End Block/Search Match status signals from search complete generator 228a and produces a discrete Interrupt signal to the processor via Priority Interrupt Expander 257 and data channel interface adapter 258. Thus both the transport status information and the discrete Interrupt flag indicating abnormal storage/retrieval unit operation are supplied to the processor.

The invention is more particularly defined in the appended claims.

We claim:

1. In an on-line mass data storage and retrieval system, the combination including:

1. an annular rotatable array of tape cassettes, each with a plurality of tracks;
2. a tape transport and a cassette loader each fixed relative to said array and to each other but each moveable relative to a cassette in said array;
3. means for addressing a cassette in said array;
4. means for positioning said addressed cassette in operative relation to said cassette loader;
5. means, including said cassette loader, for loading said addressed cassette into said transport;
6. means for addressing one of said plurality of tracks on said addressed cassette;
7. means for positioning the transport head assembly in operative relation to said addressed track; and
8. means for driving said tape relative to said head assembly to thereby effect read/write operations.

2. A system according to claim 1 wherein said means for positioning said addressed cassette includes servomechanism positioning means including position error sensing means and array drive means, said drive means including a drive shaft, said servomechanism being effective to approximately position said addressed cassette, and detent engagement means for accurately positioning and securing said addressed cassette when the position error and the speed of said drive shaft are within predetermined limits.

3. A system according to claim 2 wherein said servomechanism positioning means includes means responsive to a digital cassette address command for converting said digital address into an analog synchro command and means for utilizing said analog command to develop an analog position error signal.

4. In an on-line mass data storage and retrieval system the combination including:

1. a data controller, said controller including a programmable processor;
2. a rotatable array of tape cassettes, each having a plurality of tracks;
3. a tape transducer station, including a transducer, fixed relative to said array but moveable relative to a cassette in said array;
4. means for rotating said array to position a cassette addressed by said processor at said station;
5. means for displacing said addressed cassette from said array into operative relation to said transducer;
6. means for positioning said transducer at a track addressed by said processor; and
7. means for driving said tape relative to said transducer to effect read/write operations.

5. A system according to claim 4 wherein said rotatable array includes a tape storage cylinder including a plurality of recesses for storage of individual ones of said cassettes.

6. In an on-line mass data storage and retrieval system the combination including:

1. a data controller, said controller including a programmable processor and direct access storage means;
2. a rotatable array of tape cassettes each having a plurality of tracks, at least one said track having a plurality of data blocks recorded thereon;
3. a tape transducer station, including a transducer, fixed relative to said array but moveable relative to a cassette in said array;
4. means for rotating said array and for positioning a cassette addressed by said processor at said station;
5. means for displacing said addressed cassette from said array into operative relation to said transducer;
6. means responsive to said processor for positioning said transducer at said track having data blocks recorded thereon;
7. means responsive to said processor for driving said tape relative to said transducer so as to read at least one data block from said track and to store said data block in said direct access storage means.

7. A system according to claim 6 wherein said storage means includes drum storage means.

8. A system according to claim 6 wherein said storage means includes disk storage means.

9. A system according to claim 6 in which said means for rotating and positioning said cassette includes servomechanism means responsive to a digital command from said data controller and further includes detent means for aligning said addressed cassette at said station.

10. In an on-line mass data storage and retrieval system, the combination including:

1. a plurality of rotatable arrays of tape cassettes, each said cassette with a plurality of tracks;

2. tape transducer means fixed relative to each of said arrays but moveable relative to a cassette in each said array;
3. means for addressing one said array and one said cassette therein;
4. means for rotating said addressed array to position said addressed cassette at said transducer means associated with said addressed array.
5. means for displacing said addressed cassette from said addressed array into operative relation to said associated transducer means;
6. means for positioning said transducer means at an addressed track of said addressed cassette; and
7. means for driving said tape relative to said transducer means to effect read/write operations.

11. A system according to claim 10 wherein said tape transducer means includes at least two tape transport stations associated with each said array.

12. A system according to claim 11 wherein said transport stations are separately positioned.

13. In an on-line mass data storage and retrieval system, the combination including:
1. a rotatable array of tape cassettes, each said cassette with a plurality of tracks;
2. at least two tape transport stations fixed relative to each other and to said array but moveable relative to a cassette in said array, each said station including tape transducer means;
3. means for addressing one said cassette in said array and one track thereof;
4. means for rotating said array to position said addressed cassette at the nearest vacant one of said tape transport stations;
5. means for displacing said addressed cassette from said array into operative relation to said vacant transport station;
6. means for positioning said transducer means at said addressed track; and
7. means for driving said tape relative to said transducer means to effect read/write operations.

14. A system according to claim 13 wherein said means for positioning said addressed cassette at said nearest vacant station includes a programmable processor for calculating the nearest vacant station.

15. A system according to claim 14 wherein said processor includes means for storing .he location of the next addressed cassette, means for storing the location of the currently addressed cassette and computing means for calculating the difference between said stored locations.

16. In an on-line mass data storage and retrieval system, the combination including:
1. a data controller including a processor;
2. a plurality of rotatable arrays of tape cassettes, each said cassette with a plurality of tracks;
3. at least two tape transport stations associated with each of said arrays, said stations being fixed relative to each other and to the associated array, but moveable relative to a cassette in said array, each said station including transducer means;
4. means for rotating the array and cassette addressed by said processor to position said addressed cassette at the nearest vacant station;
5. means for displacing said addressed cassette from said addressed array into operative relation to said nearest vacant station;
6. means for positioning said transducer means at the track of said displaced cassette addressed by said processor; and
7. means for driving said tape relative to said transducer to effect read/write operations.

17. A system according to claim 16 wherein said cassettes including lengths of tape normally positioned approximately at their mid-points.

18. A system according to claim 16 wherein the tape includes data blocks recorded thereon and said means for driving said tape includes means for locating a desired data block.

19. A system according to claim 16 wherein
said data controller also includes a direct access storage means,
said addressed track includes data blocks recorded thereon, and
said means for effecting read/write operations includes means for reading at least one data block from said track for subsequent temporary storage by said processor in said direct access storage means.

20. In an on-line ;mass data storage and retrieval system, the combination including:
1. a data controller, including a programmable processor, adapted to receive read/write record requests from a host computer;
2. storage/retrieval means including:
a. a plurality of cassette bins, each cassette bin containing a plurality of tape cassettes with each cassette having a plurality of tracks.
b. a plurality of tape transducer stations, at least one said station associated with each cassette bin and fixed relative thereto but moveable relative to a cassette in said bin, each said station including a transducer means;
c. means for positioning said bin and cassette therein addressed by said processor at the station associated with said addressed bin;
d. cassette loader means for displacing said addressed cassette from said addressed bin into operative relation to said station associated therewith;
e. means for positioning said transducer means to the track of said displaced cassette addressed by said processor;
f. means for driving the tape relative to said transducer means to read data from said addressed track and transmit same to said data controller; and
3. means including said data controller operable to transmit said data to said host computer.

21. A system according to claim 20 wherein said data controller includes direct access storage means and wherein said data transmitted to said host computer is first stored in said direct access storage means.

22. A system according to claim 20 wherein at least two transducer stations are associated with each cassette bin and separately situated.

23. A system according to claim 22 wherein said means for positioning said addressed bin includes means for positioning said bin to the nearer vacant one of said two stations.

24. A system according to claim 20 wherein said means for positioning said bin includes
servomechanism means for approximately positioning said addressed cassette at said station, and detent engagement means for accurately positioning said addressed cassette at said station.

25. A system according to claim 24 wherein servomechanism means includes means responsive to a digital address command for converting said command to an analog synchro position error signal and said detent engagement means includes means for monitoring said error signal and means for actuating said detent means when the monitored error signal is within predetermined limits.

26. A system according to claim 20 wherein said transducer means includes a head assembly including read/write/write/read heads jointly positionable along one of said plurality of tracks for effecting search/erase/read/verify operations on the fly.

27. A system according to claim 20 wherein said storage/retrieval unit includes electronic control means for time sharing data read/write electronics with a plurality of transducer stations.

28. A system according to claim 20 wherein said storage/retrieval unit includes means for simultaneously effecting read operations from a plurality of addressed cassettes.

29. A system according to claim 20 wherein said tape cassettes contain tape lengths approximately positioned at about their mid-points.

30. In an on-line mass data storage and retrieval system, the combination including:

1. a plurality of rotatable arrays of tape cassettes, each with a plurality of tracks;
2. at least one tape transport station associated with each said array and fixed relative thereto but moveable relative to a cassette in said array;
3. means for rotating a first array to position a first addressed cassette at a first station;
4. means for rotating a second array to position a second addressed cassette at a second station;
5. means for respectively displacing said first and second addressed cassettes from said first and second arrays into operative relation with said first and second stations; and
6. means for simultaneously effecting read/write operations between said first and second addressed cassettes and said first and second transport stations.

31. In an on-line mass data storage and retrieval system, the combination including:

1. a data controller including a processor;
2. storage/retrieval means including a plurality of rotatable arrays of tape cassettes, each said cassette with a plurality of tracks;
   a. at least one tape transport associated with each said array, each said station including transducer means;
   b. means for simultaneously addressing cassettes and tracks thereof in said plurality of arrays;
   c. means for simultaneously rotating said arrays for positioning said addressed cassettes at the associated transport station;
   d. means for simultaneously displacing said addressed cassettes from said arrays into operative relation to said associated transport stations; and
   e. means for simultaneously effecting read/write operations on said plurality of addressed cassettes.

32. A system according to claim 31 wherein said data controller includes direct access storage means, said read/write operations include data modification operations and said tape cassettes include data blocks recorded thereon, the system further including a. means, including a transport station, for reading an addressed data block from an addressed cassette,
b. means for temporarily storing said data block in said direct access storage means,
c. means, including said processor, for modifying said data block in accordance with commands from a host computer; and
d. means, including said transport station, for writing the modified data block on said addressed cassette.

33. In an on-line mass data storage and retrieval system, the combination including:

1. a rotatable array of tape cassettes, each with a plurality of tracks;
2. a tape transducer station, including a transducer, fixed relative to said array but moveable relative to a cassette in said array;
3. means for rotating said array to position an addressed cassette at said station;
4. means for displacing said addressed cassette from said array into operative relation to said transducer, including means for positioning said transducer at an addressed track of said addressed cassette; and
5. means for driving the tape relative to said transducer to effect read/write operations.

* * * * *